(12) United States Patent
Faulkner

(10) Patent No.: US 12,056,665 B2
(45) Date of Patent: Aug. 6, 2024

(54) AGENDA DRIVEN CONTROL OF USER INTERFACE ENVIRONMENTS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/829,336

(22) Filed: May 31, 2022

(65) Prior Publication Data

US 2023/0385767 A1    Nov. 30, 2023

(51) Int. Cl.
*H04L 12/18* (2006.01)
*G06Q 10/101* (2023.01)
*H04L 67/306* (2022.01)

(52) U.S. Cl.
CPC ....... *G06Q 10/101* (2013.01); *H04L 12/1818* (2013.01); *H04L 12/1822* (2013.01);
(Continued)

(58) Field of Classification Search
CPC .............. G06Q 10/101; H04L 12/1818; H04L 12/1822; H04L 12/1827; H04L 12/1831; H04L 67/306
See application file for complete search history.

(56) References Cited

U.S. PATENT DOCUMENTS

| 8,214,242 B2 | 7/2012 | Agapi et al. |
| 8,271,600 B2 | 9/2012 | Herold et al. |

(Continued)

FOREIGN PATENT DOCUMENTS

| WO | 2009146130 A2 | 12/2009 |
| WO | 2012044272 A1 | 4/2012 |
| WO | 2020131502 A1 | 6/2020 |

OTHER PUBLICATIONS

"Engaging Virtual Events Made Easy", Retrieved from: https://web.archive.org/web/20211216150547/https:/mootup.com/virtual-events-platform/, Dec. 16, 2021, 15 Pages.

(Continued)

*Primary Examiner* — Raqiul A Choudhury
(74) *Attorney, Agent, or Firm* — Scott Y. Shigeta; Newport IP, LLC

(57) ABSTRACT

The disclosed techniques enable systems to provide agenda driven control of user interface environments. A conference system can perform a contextual determination and automatically select and apply a suitable corresponding 2D or 3D user interface construct for the conference participants. The system can also cause client endpoints to switch display between 2D and 3D settings using different user interface constructs. A system can perform contextual determination utilizing a meeting agenda and identify a meeting type based on agenda items such as: a Financial Report, a Brainstorming Session, and a Social Gathering. In response, the system automatically applies proper 2D and 3D constructs with scenes suitable for each agenda item: a conference hall with large presentation screens for the Report, a virtual room with a whiteboard for the Brainstorming Session, and a virtual room with a party theme for the Social Gathering.

20 Claims, 19 Drawing Sheets

(52) U.S. Cl.
CPC ...... *H04L 12/1827* (2013.01); *H04L 12/1831* (2013.01); *H04L 67/306* (2013.01)

(56) References Cited

U.S. PATENT DOCUMENTS

| | | | |
|---|---|---|---|
| 8,675,067 | B2 | 3/2014 | Chou et al. |
| 9,305,465 | B2 | 4/2016 | Hyndman et al. |
| 9,503,685 | B2 | 11/2016 | Baron et al. |
| 10,999,088 | B2 | 5/2021 | Iyer et al. |
| 11,238,382 | B1* | 2/2022 | Graziano ........... G06Q 10/1095 |
| 2009/0222742 | A1 | 9/2009 | Pelton et al. |
| 2009/0234721 | A1* | 9/2009 | Bigelow ............... G06Q 10/10 715/753 |
| 2009/0259937 | A1 | 10/2009 | Rohall et al. |
| 2011/0109715 | A1 | 5/2011 | Jing et al. |
| 2019/0108834 | A1* | 4/2019 | Nelson ..................... G06N 5/04 |
| 2020/0258051 | A1* | 8/2020 | Ma ..................... G06Q 10/1095 |
| 2020/0371677 | A1 | 11/2020 | Faulkner et al. |
| 2021/0117929 | A1* | 4/2021 | Lewbel ............. G06Q 10/1095 |
| 2022/0103566 | A1 | 3/2022 | Faulkner |

OTHER PUBLICATIONS

"Immersive View", Retrieved from: https://support.zoom.us/hc/en-us/articles/360060220511-Immersive-View, Feb. 3, 2022, 4 Pages.

Armstrong, Stephen, "Humanize the Online Experience", Retrieved from: https://remo.co/?utm_source=hoppier&utm_medium=referral&utm_campaign=virtual_event_platform_blog, Apr. 1, 2022, 11 Pages.

Ball, David, "Introducing Immersive View, A Fun New Way to Meet", Retrieved from: https://blog.zoom.us/introducing-zoom-immersive-view/, Apr. 26, 2021, 4 Pages.

Fleming, Tim, "How Virtual Reality is Transforming the Way We Conduct Business Meetings", Retrieved from: https://web.archive.org/web/20210412005935/https:/www.futurevisual.com/blog/virtual-reality-business-meetings/, Apr. 12, 2021, 6 Pages.

He, et al., "CollaboVR: A Reconfigurable Framework for Creative Collaboration in Virtual Reality", In Proceedings of IEEE International Symposium on Mixed and Augmented Reality, Nov. 9, 2020, 13 Pages.

Seal, Rebecca, "Can Virtual Meeting Spaces Save us all from Zoom Fatigue?", Retrieved from: https://www.theguardian.com/technology/2021/may/08/work-can-virtual-meeting-spaces-save-us-all-from-zoom-fatigue, May 8, 2021, 13 Pages.

"International Search Report and Written Opinion Issued in PCT Application No. PCT/US23/018252", dated Aug. 14, 2023, 15 Pages.

* cited by examiner

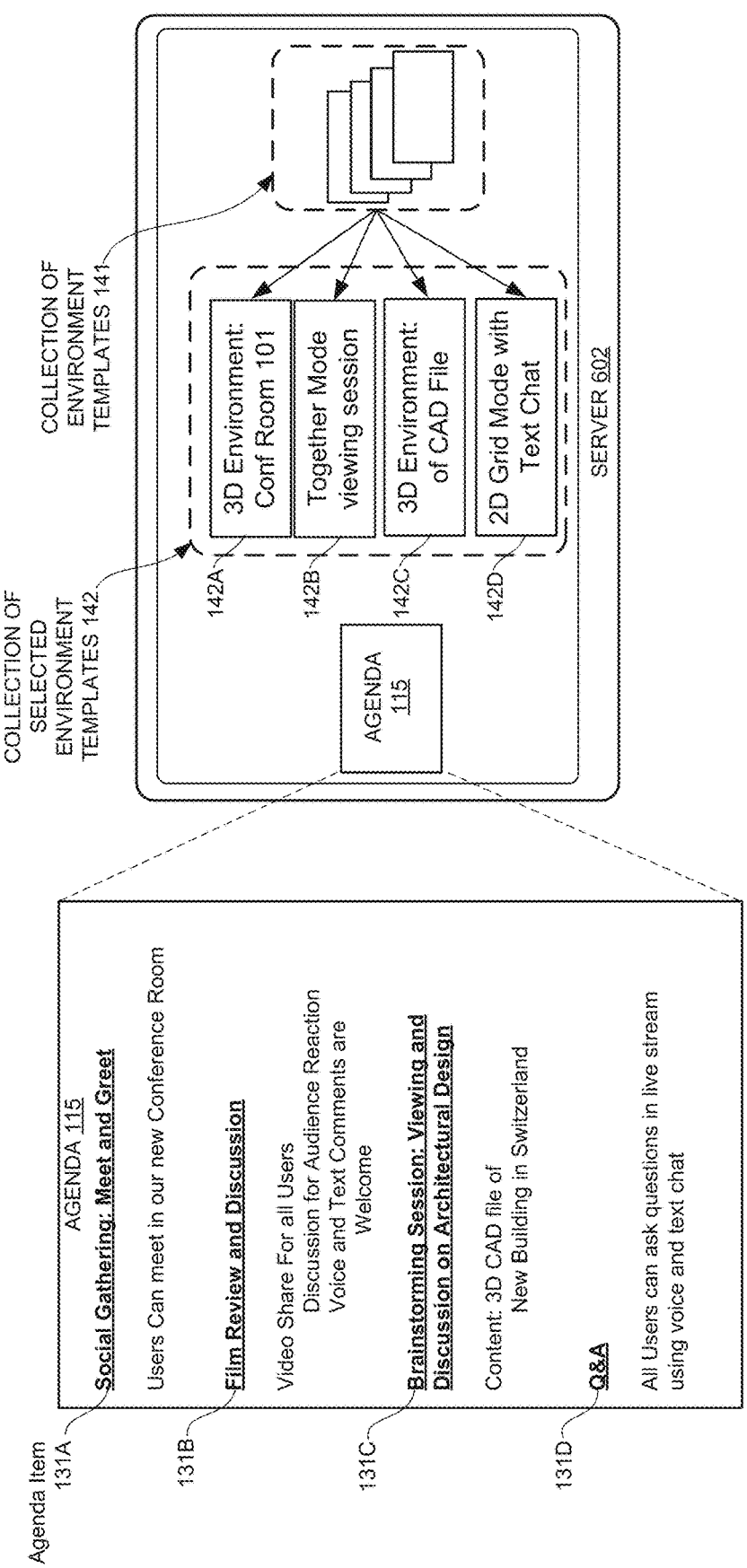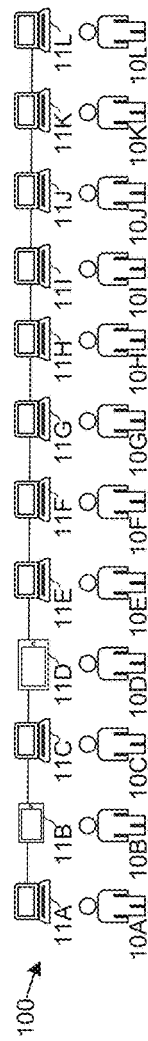
FIGURE 1A

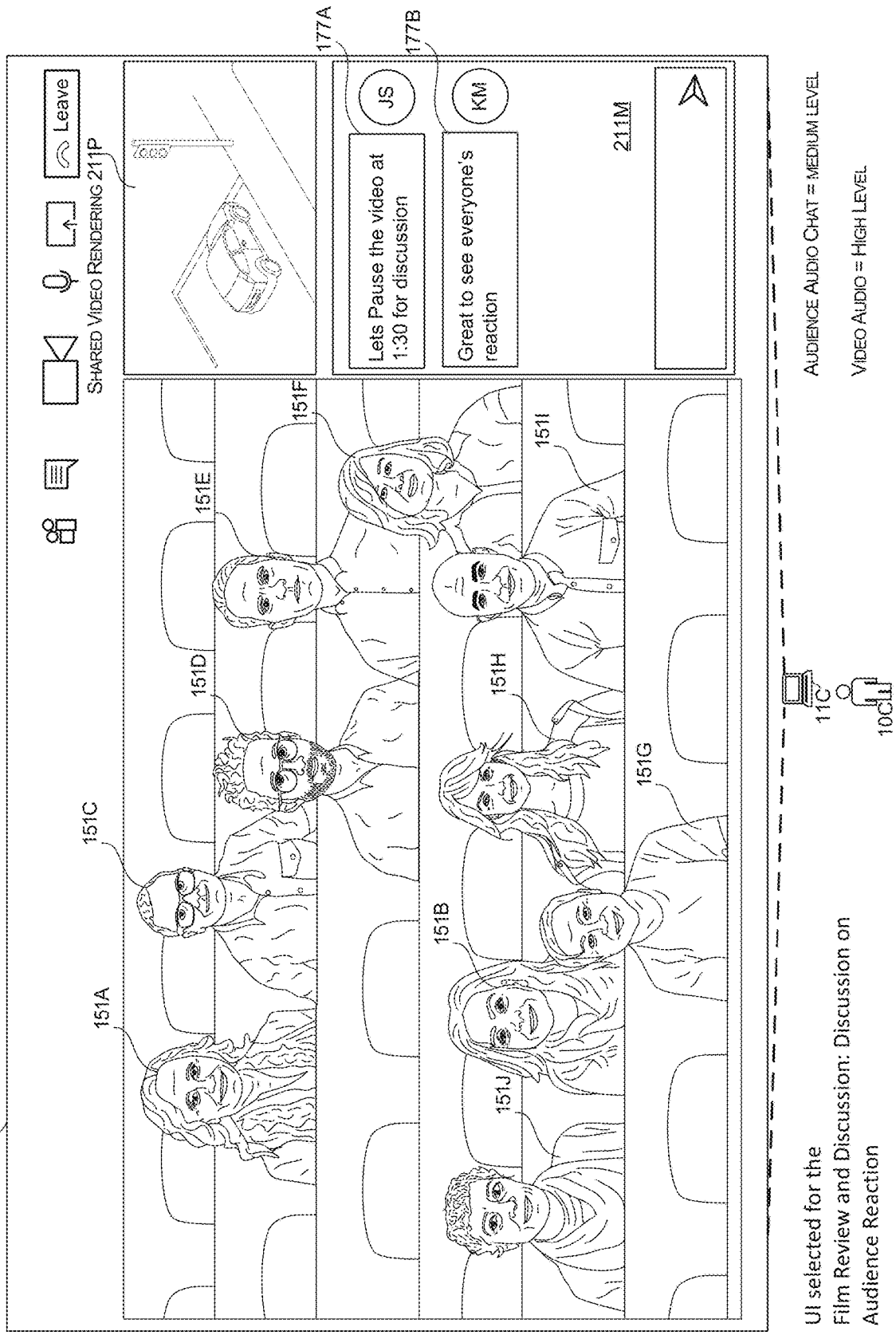

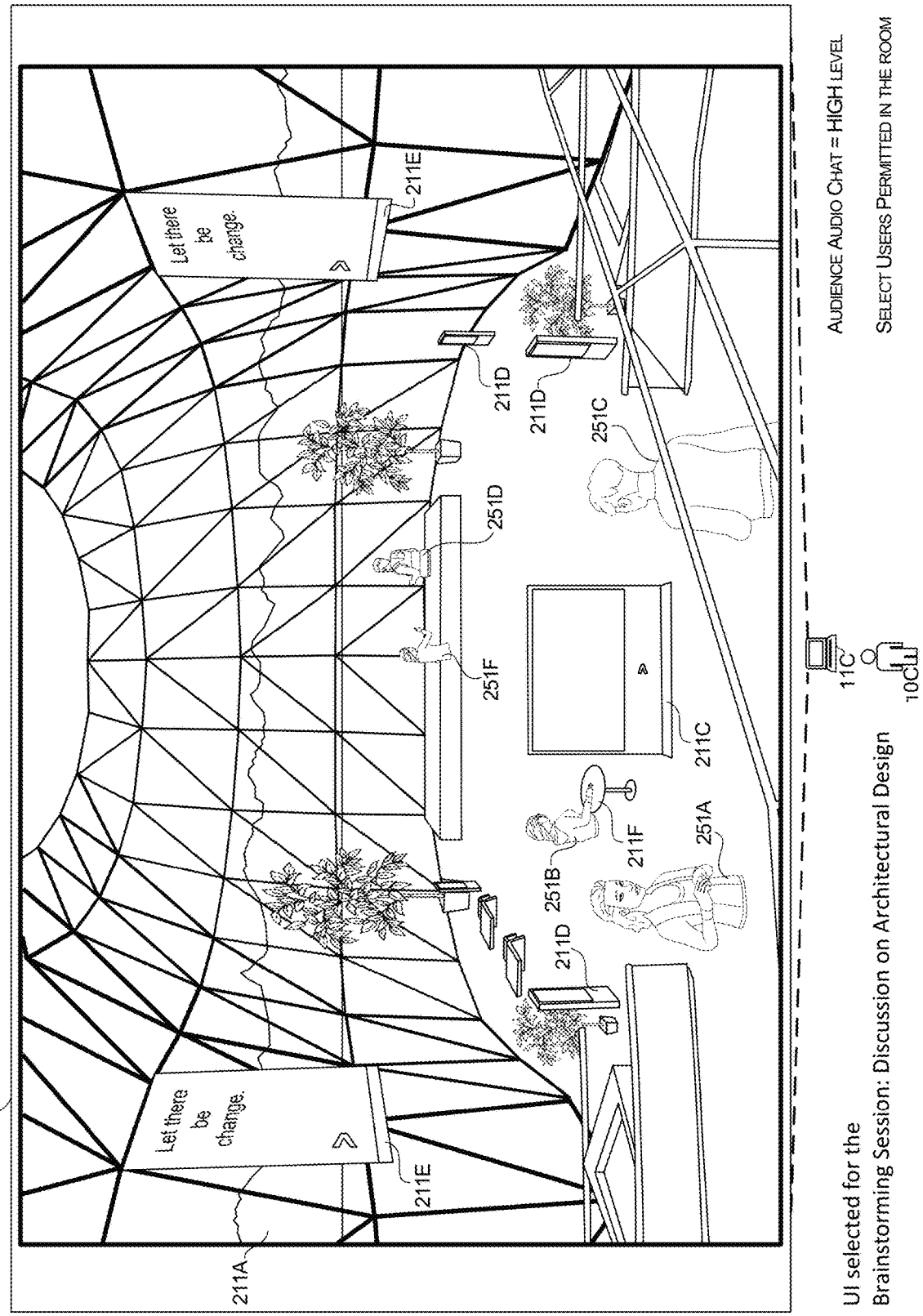

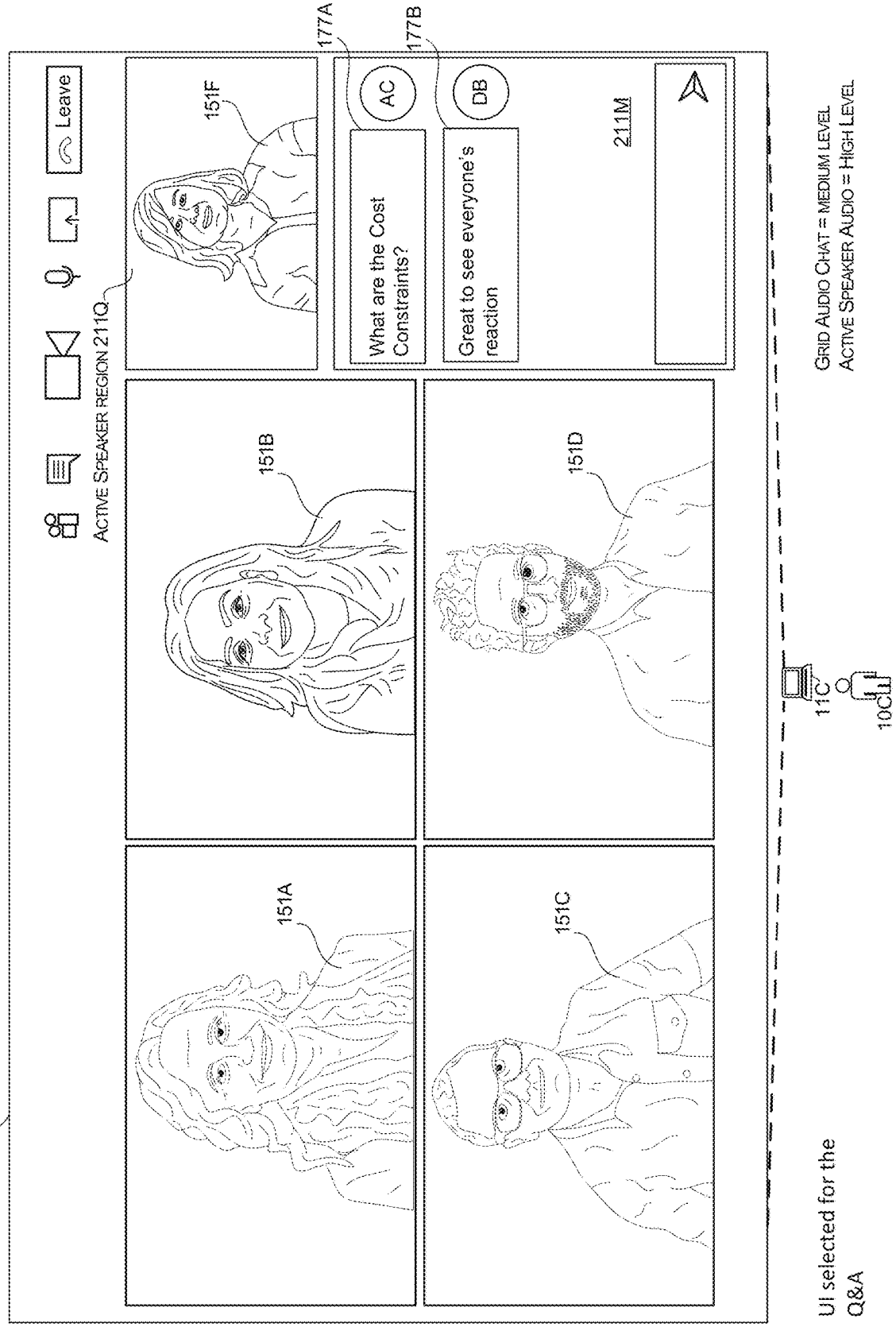

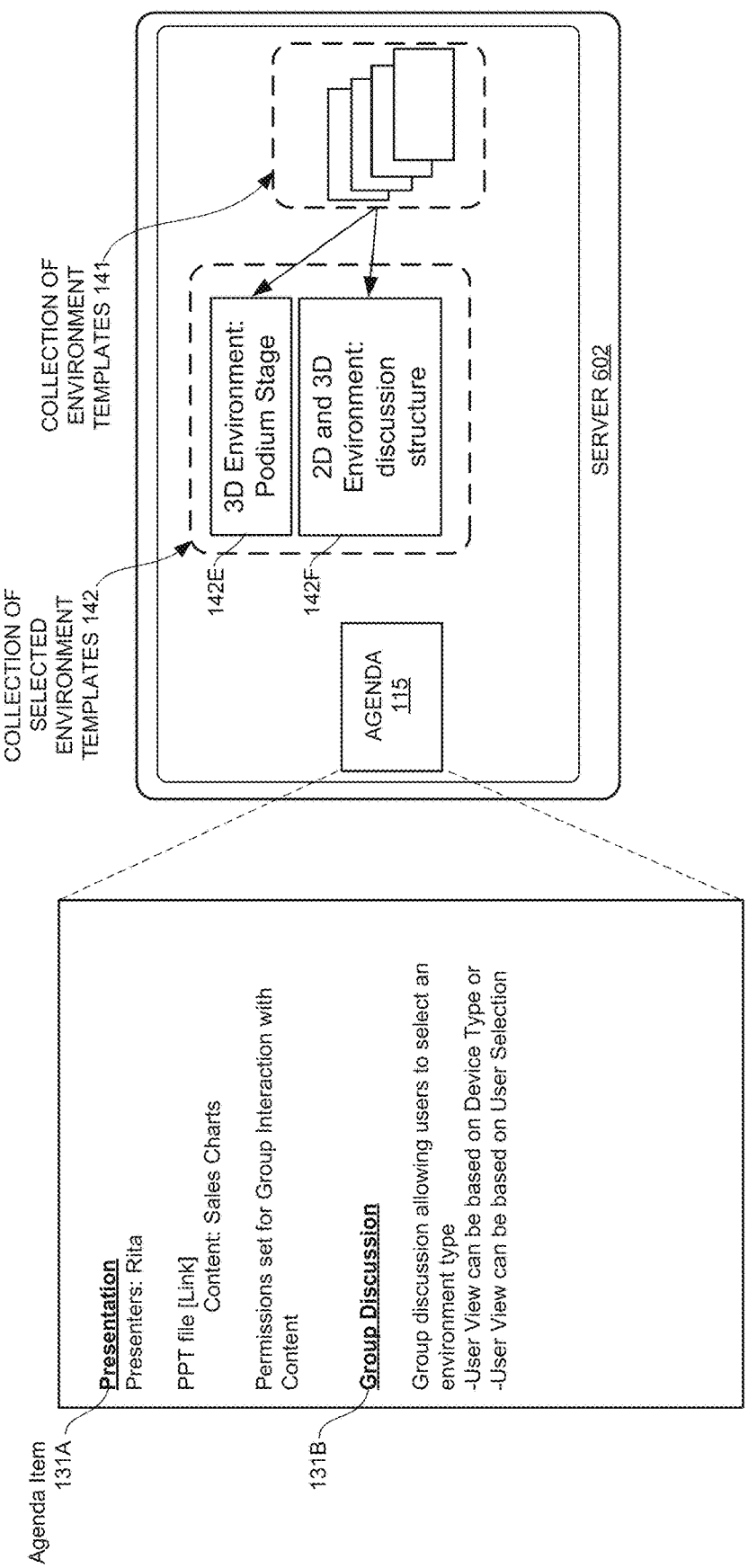
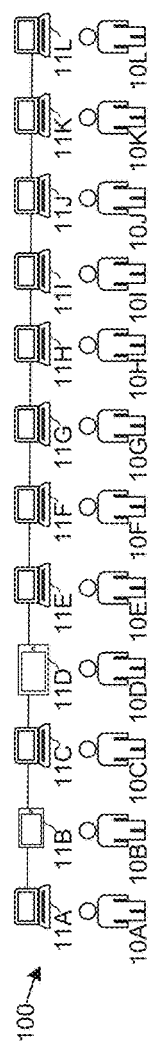
FIGURE 2A

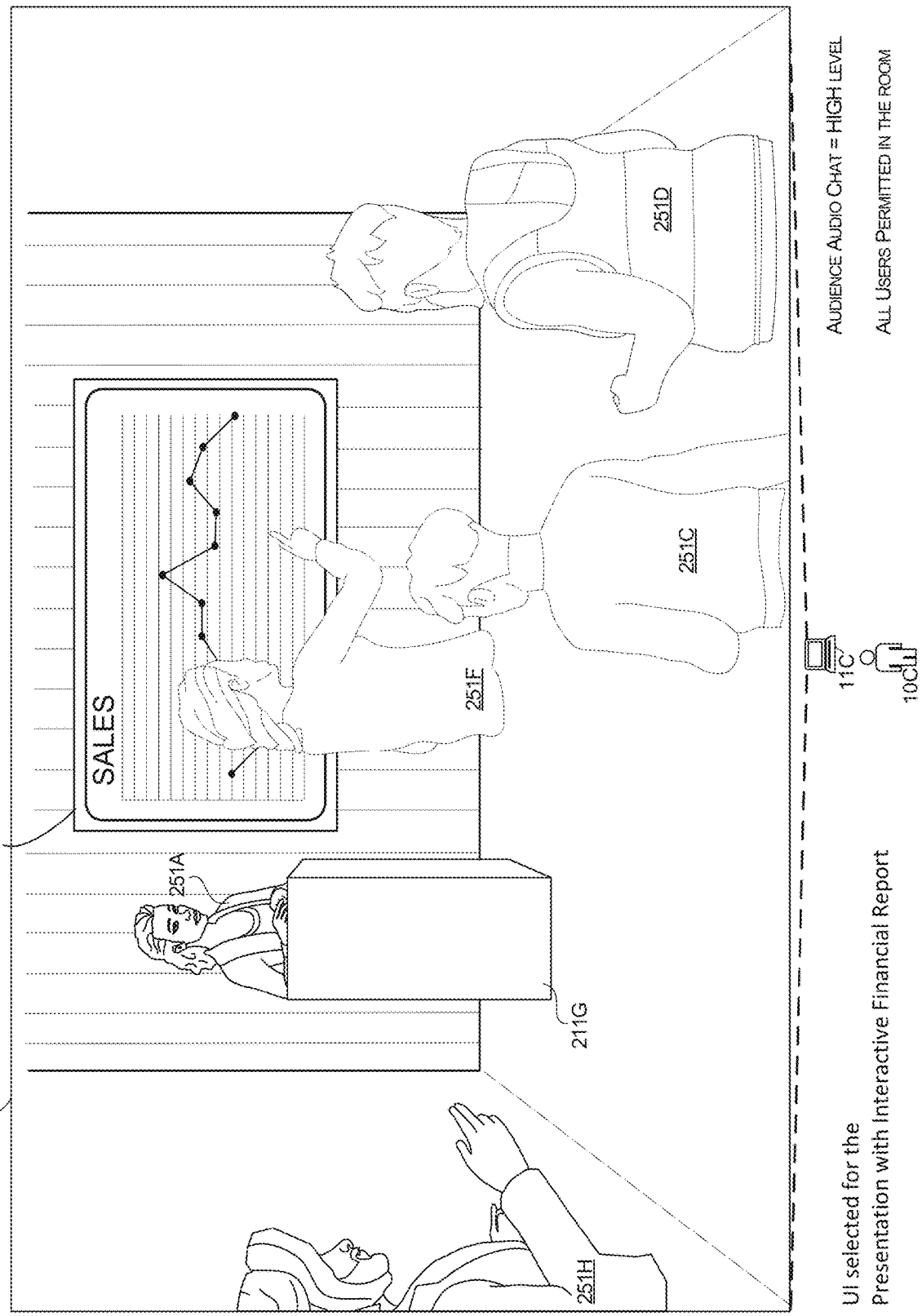

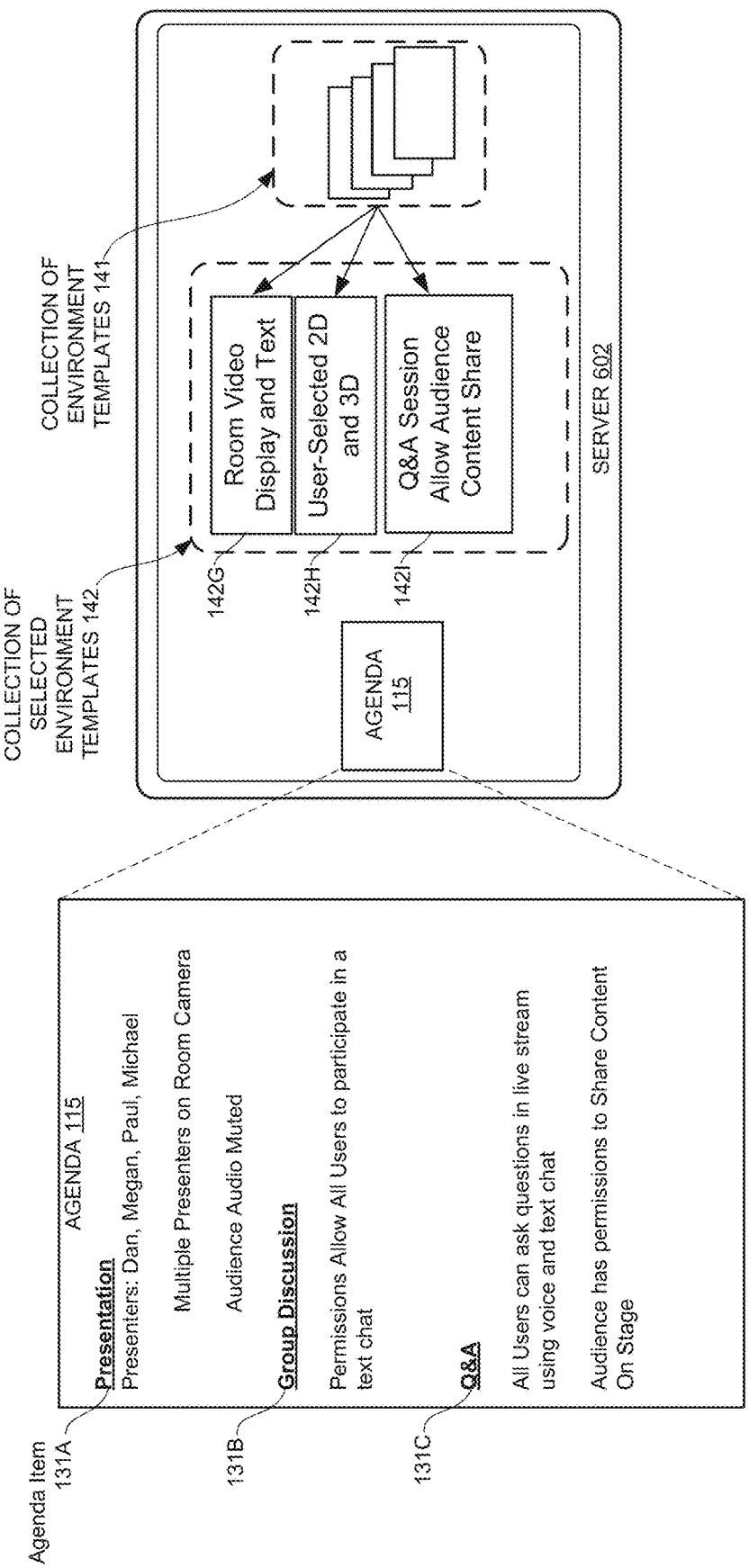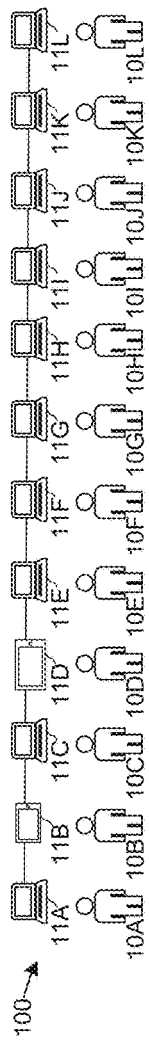
FIGURE 3A

AGENDA DRIVEN CONTROL OF USER INTERFACE ENVIRONMENTS

BACKGROUND

The use of metaverse environments for on-line meeting applications is becoming ubiquitous. Participants of online meetings now meet in three-dimensional virtual environments and share content within those virtual environments. Despite a number of benefits over other forms of collaboration, the use of 3D environments, both augmented reality and virtual reality, for sharing content can raise a number of drawbacks.

One of the main issues with using metaverse environments for on-line meeting applications is that many of the existing environment formats are not optimized for every meeting scenario. Although three-dimensional environments for a virtual reality experience can be setup for a certain type of meetings, e.g., a social gathering or a presentation, these preset environments may not be optimal for accommodating every use scenario. For instance, some virtual reality spaces are made for a large group of individuals. This may be difficult for a small group of people to meet because it can be hard to locate one another and to keep a meeting focused. In addition, these preset environments do not always provide tools for every type of meeting. For instance, a preset virtual conference room may only have one virtual screen for sharing content. This setup may not be optimal for meetings where multiple presenters need to share different slide deck files simultaneously.

These issues become more complicated when a meeting may have an agenda with a number of different types of agenda items. For instance, a meeting agenda may have several segments that involve a social gathering, a presentation by a particular individual, and a question-and-answer segment. Although some preset virtual environments may be suitable for accommodating one of the segments, such as a meeting room that is preset for allow for audience members to watch a presentation by a single person, that preset virtual environment may not be suitable for the other agenda items such as a social gathering or a question-and-answer segment. This issue causes many inefficiencies within a meeting. For instance, users may have to exit a particular virtual environment after an agenda item has been completed, return to a menu to select another environment, and then re-enter the other environment to resume the meeting. This disruption can cause a number of inefficiencies with respect to the use of computing resources. Moreover, such disruptions can cause inefficiencies with respect to the flow of a meeting.

These shortcomings can lead to ineffective interactions between a computing device and a user. In addition, particularly in communication systems, the above-described shortcomings of existing systems can lead to inefficient communication of information and a loss in user engagement. Computing devices that do not promote user engagement, or worse, contribute to a loss of user engagement, can lead to production loss and inefficiencies with respect to a number computing resources. For instance, when a user becomes fatigued or disengaged, or when that user does not receive information in effective ways, that user may need to refer to other resources, such as documents or use other forms of communication, when shared content is missed or overlooked. Missed content may need to be re-sent when viewers miss salient points or cues during a live meeting. Such activities can lead to inefficient or duplicative use of a network, processor, memory, or other computing resources.

Thus, there is an ongoing need to develop improvements to help make the user experience of communication systems more engaging and more like an in-person meeting. In addition, there is an ongoing need to develop improvements to help improve the accessibility features of communication systems.

SUMMARY

The techniques disclosed herein enable systems to provide agenda driven control of user interface environments. A conference system can perform a contextual determination and automatically select and apply a suitable corresponding 2D or 3D user interface construct for the conference participants. The system can also cause client endpoints to switch display between 2D and 3D settings using different user interface constructs based on contextual data defining aspects of an event, such as a meeting, broadcast, or a private communication session. In some configurations, a system can perform contextual determination utilizing a meeting agenda. In a virtual meeting, which can include 2D image-based interface arrangements or 3D, e.g., augmented reality or virtual reality interface arrangements, the system can perform a contextual determination on contextual data such as a meeting agenda including agenda items such as: a Financial Report, a Brainstorming Session, and a Social Gathering. In response, the system automatically applies proper 2D and 3D constructs for scenes suitable for, and corresponding to, each agenda item. For example, for the first agenda item, the system can cause a display of a conference hall with large presentation screens for a large audience, for the second agenda item, the system can cause a display of a group discussion with whiteboard, and for the third agenda item, the system can cause a display of a virtual room with a party theme. The system can select different user interface environments from a series of templates that can each be customized with individual constructs. for example, metadata defining a particular interface environment can define a number of virtual seats in a theater, a number of virtual computer screens for a presenter, a size for each of the virtual computer screens, and different attributes for decorations and color patterns.

The techniques disclosure in provide a number of technical benefits. By selecting individual user interface environments for individual agenda items, a system can dynamically change an operating mode of a computer to provide different experiences that can enhance user engagement as well as improve user interaction efficiencies, which can ultimately improve the efficiency of a computing system. In one illustrative example, if a meeting transitions between a single presenter to a number of different presenters, and the system recognizes this arrangement in the agenda, the system can dynamically provide a single point of focus for the single presenter, such as a podium, and a large screen display for their shared content. Then, when this system transitions to multiple presenters such as a panel, the system could provide multiple screens automatically and a larger point of focus for multiple speakers to help audience members focus on the speakers. The system can provide these transitions without the need of an administrator to interrupt a meeting to change the configuration or manual entry to control the user interface transitions, which can cause errors and delay.

This by helping audience members focus on the right content by selecting and controlling the transitions of user interface environments, a system can help mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates an example of a system that can select different user interface environments based on a meeting agenda comprising a social gathering, a film review discussion, a brainstorming session and a question-and-answer session.

FIG. 1C illustrates an example of a user interface environment that can be utilized for a meeting agenda item that includes a film review discussion.

FIG. 1D illustrates an example of a user interface environment that can be utilized for a meeting agenda item that includes a brainstorming session.

FIG. 1E illustrates an example of a user interface environment that can be utilized for a meeting agenda item that includes a question-and-answer session.

FIG. 2A illustrates an example of a system that can select different user interface environments based on a meeting agenda comprising a presentation session and a group discussion session.

FIG. 2B illustrates an example of a user interface environment that can be utilized for a meeting agenda item that includes a presentation session.

FIG. 3A illustrates an example of a system that can select different user interface environments based on a meeting agenda comprising a presentation, a group discussion, and a question-and-answer session.

DETAILED DESCRIPTION

Figure 1B:
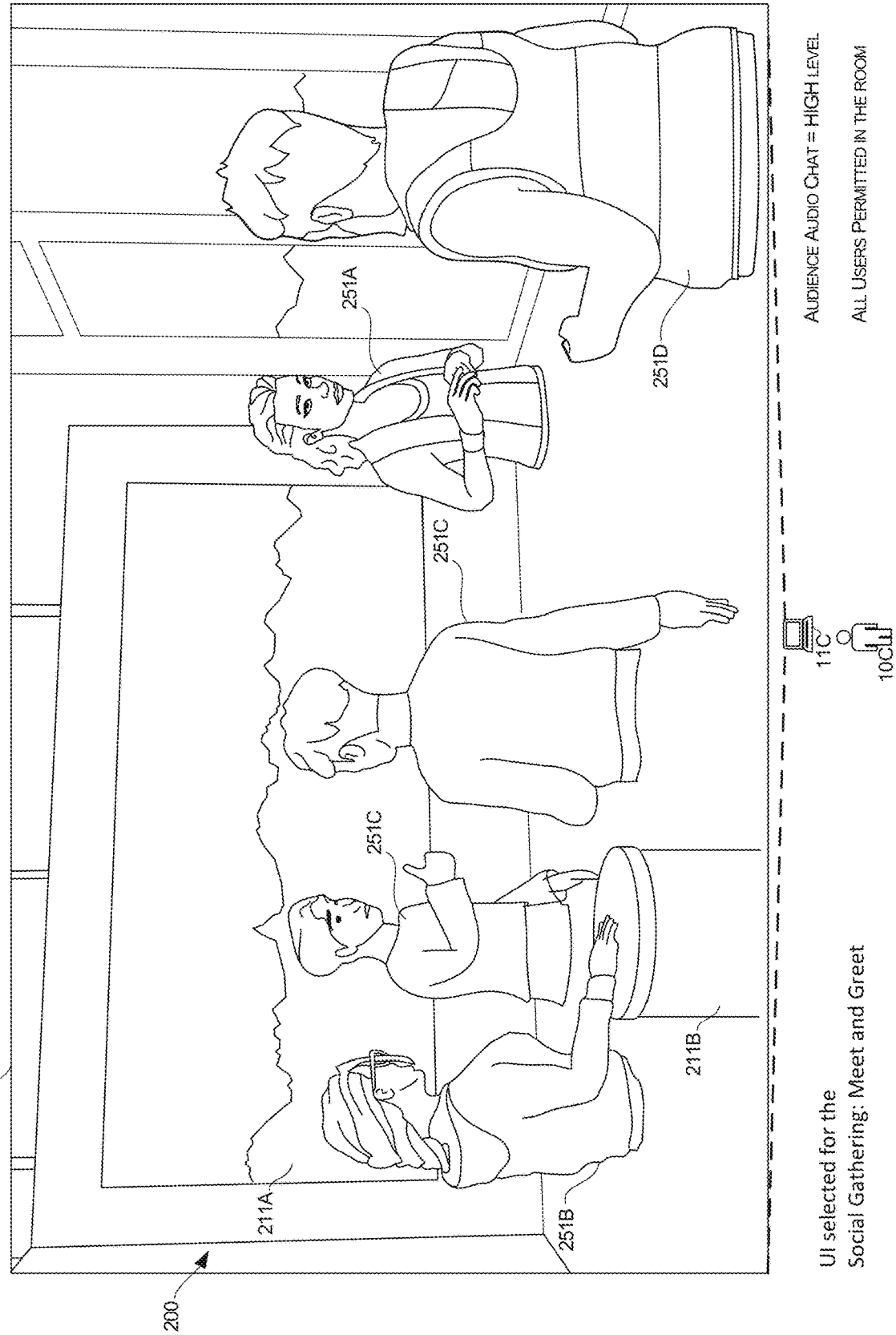
FIG. 1B illustrates an example of a user interface environment that can be utilized for a meeting agenda item that includes a social gathering.

FIGS. 1A through 1E illustrate an example of how a system 100 can analyze contextual data 115 for the purposes of selecting various user interface environment templates 141 to generate a collection of selected environment templates 142. Individual user interface environment templates that are selected for an agenda item are also referred to herein as a "collaboration environment 142." In some configurations, the system can determine an activity category for individual agenda items. The activity categories that correspond to an environment template can cause a selection of that environment template for association with a particular agenda item. The system then manages the flow of an event, such as a meeting, by causing a display of the selected environment templates 142 in a manner that is consistent with the order of the contextual data. In one example, the contextual data is in the form of an agenda 115 comprising a number of agenda items: a social gathering, a film review discussion, a brainstorming session and a question-and-answer session. Based on this agenda 115, the system selects four environment templates 142 from a collection of environment templates 141. In this example, a first selected template 142A includes a 3D environment for a conference room, a second selected template 142B includes a 2D user interface referred to herein as a Together Mode UI, a third selected template 142C includes a 3D environment that is based on a shared file, e.g., an architectural CAD file, a fourth selected template 142D includes a 2D user interface in a grid layout of 2D image renderings of live video streams. Each template can be used by the system to generate renderings of user interface environments that can dynamically change as the system 100 tracks and manages the meeting using the agenda for flow control.

By selecting individual user interface environments for individual agenda items, a system can dynamically change an operating mode of a computer to provide different experiences that can enhance user engagement as well as improve user interaction efficiencies, which can ultimately improve the efficiency of a computing system. In one illustrative example, if a meeting transitions between a single presenter to a number of different presenters, the system recognizes this arrangement in the agenda and/or by user activity and dynamically provides a UI having a single point of focus for the single presenter, such as a virtual podium, and a large screen display for their shared content, then automatically transitions to another UI having multiple points of focus for each presenter, e.g., by providing several virtual podiums and providing several large screen displays for the content of each presenter.

As shown in FIG. 1A, a system 100 can include at least one server 602 and a number of client computing devices 11 each associated with individual users 10. The system 100 can manage a communication session, such as a meeting, live broadcast, a text chat session, or any other collaborative event that allows users 10 to share video, audio and/or content. In this example, the First User 10A is associated with the first computer 11A, the Second User 10B is associated with the second computer 11B, the Third User 10C is associated with the third computer 11C, the Fourth User 10D is associated with the fourth computer 11D, the Fifth User 10E is associated with the fifth computer 11E, the Sixth User 10F is associated with the sixth computer 11F, the Seventh User 10G is associated with the seventh computer 11G, the Eighth User 10H is associated with the eighth computer 11H, the Ninth User 10I is associated with the nineth computer 11I, and the tenth User 10J is associated with the tenth computer 11J. These users can also be respectively referred to as "User A," User B," up to User N.

Also shown in FIG. 1A, the system can receive or generate contextual data 115. In some configurations, the contextual data can include an outline for a meeting, the contextual data 115 is also referred to herein as an agenda 115. The agenda 115 can include a number of agenda items 131A. An agenda item can include a description or goal of a meeting segment. A meeting segment may include a portion of a meeting such as an introduction, presentation, conclusion, etc. A segment may be associated with a time period, duration, start time, or end time, each of which can trigger the system to transition between user interface environments and operating modes. The system can also transition between the user interface environments by the use of other triggers including user activities, e.g., a user sharing content, removing shared content, a start of a speech, an end of a speech, people leaving a meeting, people joining a meeting, etc.

In this example, the agenda includes a first agenda item 131A for a first meeting segment with the goal of hosting a social gathering. The agenda also includes a second agenda item 131B for a second meeting segment with the goal of having participants review a film and discuss the film contents. The second agenda item also indicates that users should discuss audience reactions to the video. Also shown, the agenda 115 also includes a third agenda item 131C with a goal of facilitating a brainstorming session, and a fourth agenda item 131D with a goal of facilitating a question-and-answer (Q&A) session.

The system can analyze the agenda to determine a number of agenda items, and thus determine a number of environment templates that are needed for a meeting. Each agenda item may be identified by analyzing the text of the agenda and determining a match with a databased having a predetermined list of agenda items. For example, if the server stores a database having keywords such as "brainstorm" or "social," these keywords can be associated with certain templates 141. In this example, the system may determine the existence of a first agenda item based on the keyword of social gathering, a second agenda item based on the keyword of discussion or "film review," a third agenda item based on a keyword such as "brainstorming," a fourth agenda item based on a keyword such as "Q&A," etc.

Once each agenda item is identified, each agenda item can be analyzed to select a corresponding environment template 141. As described in more detail below, each environment template 141 can be associated with keywords. Thus, when an agenda item includes a description having keywords that have a threshold match with keywords of a template, the system may select that particular environment template for use with that agenda item.

Figure 4:
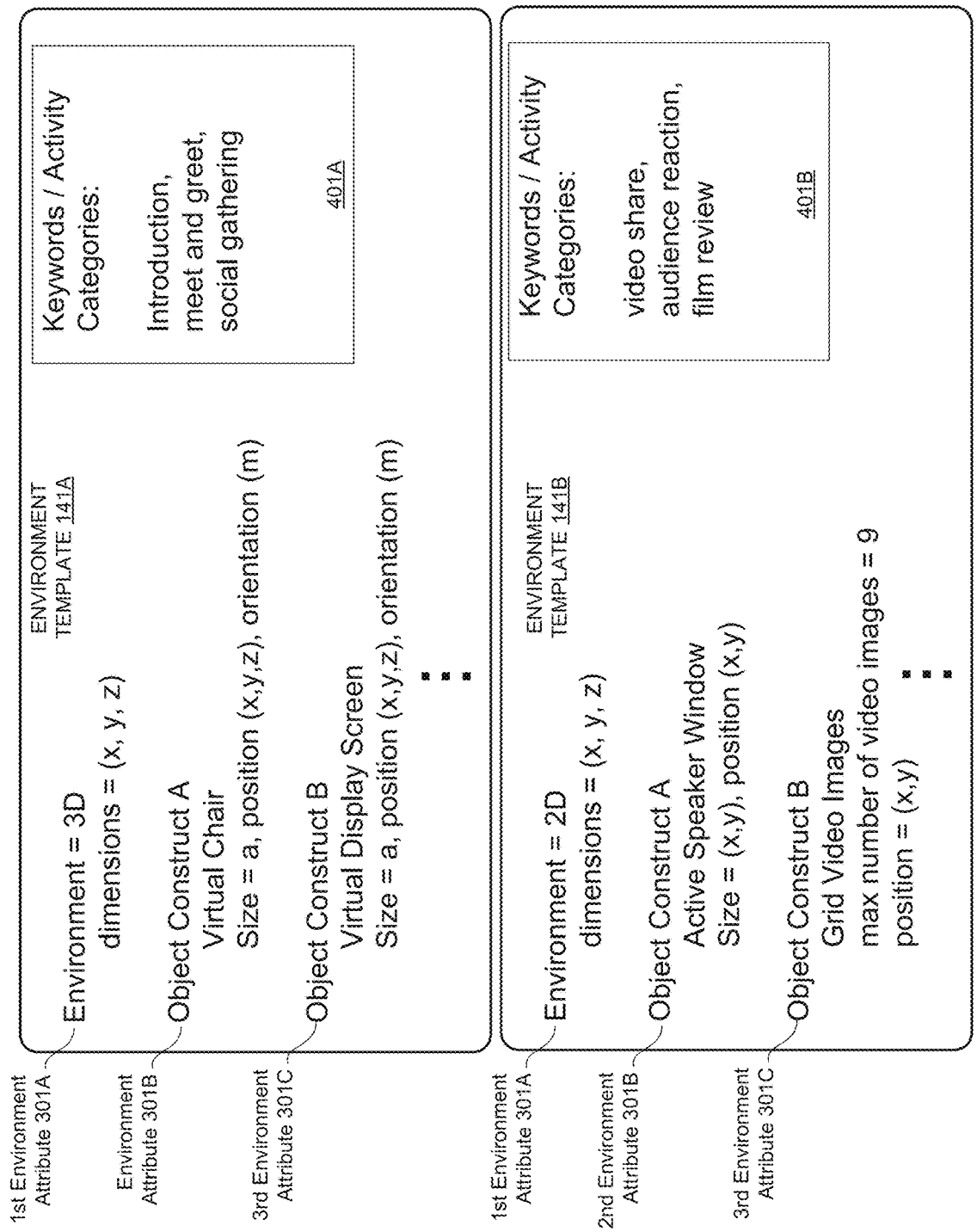
FIG. 4 illustrates aspects of data structures that define aspects of UI environment templates.

For illustrative purposes, consider an example scenario where first environment template 142A is associated with particular keywords such as "social gatherings," "meet" and "greet." An example of this association between an environment template and the keywords is shown in FIG. 4. In this example, the system can analyze the first agenda item and select the first environment template 142A based on the fact that the first environment template is associated with keywords that have a threshold match with the first agenda item. In response to selecting a particular environment template 142A for the first agenda item, the system can generate data that links the selected environment template 142A with the first agenda item. This link can be stored in a database, such as the contextual data stored on the server described herein.

Using the link associating the first selected template with the first agenda item, when the system initiates the meeting with the first agenda item, the system can cause each of the client computers to display a user interface arrangement based on the first environment template 142A. An example of a first user interface arrangement 101A that is rendered using definitions of the first environment template 142A is shown in FIG. 1B. In this particular example, the first environment template 142A defines a 3D environment with a particular conference room having virtual windows and virtual furniture. The rendering of the 3D environment 200 shows 3D representations 251 of the users, and each corresponding user is allowed to move their respective renderings throughout the environment 200.

An environment template can also define virtual objects 211 that can be utilized in the 3D environment 200, such as a virtual window 211A showing a customized scene and a virtual table 211B. The selection and position of each virtual object 211 can be defined in the template, and each template can be customized based on specific events. For instance, one template may include a virtual window 211A for events having shared content, and the scene displayed in the virtual window can display aspects of the content. For instance, in this example, the agenda includes a shared CAD file of a building intended to be built in Switzerland. In this scenario, the system can detect the location associated with the content, e.g., Switzerland, and generate a contextually relevant scene, e.g., a view of the Swiss Alps.

In addition to controlling the visual environment that is displayed by the system for each agenda item, the system can analyze each agenda item to identify descriptions that indicate audio and video preferences. The system can then use those interpreted preferences to modify permissions, audio settings and video settings for each environment that is displayed for a corresponding agenda item. For example, in the first environment template, the system can interpret the goal of conducting a social gathering and determine that vocal chat volumes should be at a higher volume then ambient noise such as background music or other computer sound effects. in addition, by interpreting the goal as conducting a social gathering, the system can allow all users to chat equally. The system can restrict audio signals for environment templates that have other goals. For instance, if the agenda item mentioned that two people should have a private conversation, while other users should conduct a social gathering, the system should allow those two individuals to have a private conversation, separating the audio channel for those two individuals from audio channels of other users. This particular permission setting can be invoked during the segment of the meeting pertaining to the first agenda item. Once the meeting transitions from the first agenda item to the second agenda item these permissions can change to another setting or reset to a default setting.

The system can also control access to content for each meeting segment. For instance, during the first segment of this meeting where users are conducting a social gathering, the system can restrict access to any shared content that applies to any other agenda item. For instance, in other meeting segments, pertaining to the second and third agenda items, the agenda refers to, or provides links to, shared content such as a video and a shared file. The system can restrict access to that shared content during other segments of the meeting, e.g., during the Social Gathering.

The system can control visual environments, permissions, audio settings for each user. This can be enabled by modifying permissions for a system or by controlling an operating mode of the system. These permissions or operating modes can apply to access to content, audio settings, and also control restrictions that apply to avatars within a 3D environment. For instance, in a template that involves a room for a social gathering, the system can configure and use the permissions associated with the first template to allow the users to move to any position of a virtual environment freely without restriction. However, for another virtual environment, such as an auditorium, the system may configure and utilize permissions that restrict users from certain locations of the virtual environment. For instance, in an auditorium setting, the system may only allow users to navigate to a seating area and restrict users from entering the stage.

Turning now to FIG. 1C in conjunction with FIG. 1A, aspects of the second agenda item 131B and the second environment template 142B are described. For illustrative purposes, consider an example scenario where second environment template 142B is associated with particular keywords such as "film review," "video share" and "audience reaction." An example of this association between an environment template and the keywords is shown in FIG. 4. Using this example data, the system can analyze the second agenda item and select the second environment template 142B based on the fact that the second environment template is associated with keywords that have a threshold match with the second agenda item. In response to selecting a particular environment template 142B for the second agenda item, the system can generate data that links the selected environment template 142B with the second agenda item. This link can be stored in a database, such as the contextual data stored on the server.

Using the link associating the second selected template with the second agenda item, when the system transitions the meeting from the first agenda item to the second agenda item, the system can cause each of the client computers to display a user interface arrangement based on the second environment template 142B. An example of a second user interface arrangement 101B that is rendered using definitions of the second environment template 142B is shown in FIG. 1C. In this particular example, the second environment template 142B defines a 2D environment with a Together Mode UI. In this configuration, the system arranges 2D video feeds of each user positioned in a seating arrangement based on the definitions of the second environment template 142B. The second environment template 142B also defines a region for displaying a video of shared content and a region for providing a text thread for all users to participate. Given these definitions in the second environment template 142B, the rendering of the user interface includes objects 211, such as a shared video rendering 211P and a chat thread rendering 211M.

In this example, the second environment template 142B also defines parameters that controls the audience audio to a medium level and controls the video audio to a high level. These levels can be established from an interpretation of the second agenda item. The system can identify from the description that the video is to be shared with all users and the discussion is to be facilitated using voice and chat. Thus, the system can modify the permissions and volume level accordingly. Given that the goal of the agenda item is to have the audience watch a video and facilitate discussions, the volume of the video can be higher than the volume level of the audio chat. The system can interpret variations from the agenda. For example, if the agenda item were to state that the volume of the voice chat should be higher than the video, this system can accommodate that description and change the audio settings accordingly. In addition, the system can modify permissions based on the second end item by allowing all users to have access to the video, given the description of the agenda item.

Turning now to FIG. 1D in conjunction with FIG. 1A, aspects of the third agenda item 131C and the third environment template 142C are described. For illustrative purposes, consider an example scenario where third environment template 142C is associated with particular keywords such as "brainstorming." In addition, this particular environment template 142C is associated with a particular file type, e.g., a CAD file. Thus, when an agenda item includes the keyword brainstorming and/or the agenda item is associated with a shared file having the particular file type, e.g., a CAD file, the system can select a corresponding environment template, such as the third environment template 142C. In response to selecting the third environment template 142C for the third agenda item, the system generates data that links the selected environment template 142C with the third agenda item.

In this example, the system selects a third environment template 142C based on the keywords of the description of the third agenda item 131B in combination with the fact that a CAD file was shared in association with that agenda item. The analysis of associating a template with a particular agenda item can be based on text matching or file types. Thus, even if there is no text matching between keywords of an agenda or keywords associated with a particular environment template, the system may select that particular environment template just based on a type of file shared in association with a particular agenda item.

The environment template can have a number of definitions for each parameter of a virtual room or virtual objects within the room. An interpretation of the shared content, such as the CAD file, can also cause the system to generate a fully customized virtual environment based on the contents of the file. in addition, the system can also place the customized virtual environment at a location based on contextual data related to the agenda item. In this example, since the CAD file is of a building the team is constructing in Switzerland. Based on this file, this virtual environment constructed based on the structure defined in the CAD file and the virtual environment is placed within a scene in Switzerland. In this case, since the CAD file is of a building within Switzerland, this virtual environment is placed within a scene of Switzerland, and the system can display a view of the physical area. In this example, the system displays a mountain range of Switzerland in response to the interpretation of the shared content. As described herein, the scene information can come from various sources such as a map program. Thus, a customized environment template can be constructed from data of a shared file and data from external resources such as a map database.

FIG. 1D shows how the contents of a shared file can be utilized to generate a virtual environment. The system can also interpret aspects of the agenda item and place virtual objects 211 within the structure. In this example, since the system places the virtual structure in Switzerland, a virtual window 211A can be rendered showing a mountain range of Switzerland in response to the interpretation of the shared content. The system can also place virtual kiosks 211D, virtual banners 211E, and virtual furniture 211F with in the three-dimensional environment 200.

Using the link associating the third environment template with the third agenda item, when the system transitions the meeting from the second agenda item to the third agenda item, the system can cause each of the client computers to display a user interface arrangement based on the third environment template 142C. An example of a third user interface arrangement 101C that is rendered using definitions of the third environment template 142C is shown in FIG. 1D.

In this example, the third environment template 142C also defines parameters that controls the audience audio to a medium level. These levels can be established from an interpretation of the third agenda item. In addition, the system can modify permissions or an operating state of the system to allow each user to control the movement of their respective 3D representations 251 and allow them to move within the structure defined in the shared content, e.g., the building. If the system has additional areas for other agenda items, the system can restrict users from moving their avatars into those other areas. For instance, if this agenda had a particular agenda item that included an afterhours party and the system generated a separate room for that event, the users would be restricted from moving into that area until the meeting progressed to that agenda item.

Turning now to FIG. 1E in conjunction with FIG. 1A, aspects of the fourth agenda item 131D and the fourth environment template 142D are described. For illustrative purposes, consider an example scenario where fourth environment template 142D is associated with particular keywords such as "Q&A," "question" and "answer." Using this example data, the system can analyze the fourth agenda item and select the fourth environment template 142D based on the fact that the fourth environment template is associated with keywords that have a threshold match with the fourth agenda item. In response to selecting a particular environment template 142D for the fourth agenda item, the system can generate data that links the selected environment template 142D with the fourth agenda item.

Using the link associating the fourth selected template with the fourth agenda item, when the system transitions the meeting from the third agenda item to the fourth agenda item, the system can cause each of the client computers to display a user interface arrangement based on the fourth environment template 142D. An example of a fourth user interface arrangement 101D that is rendered using definitions of the fourth environment template 142D is shown in FIG. 1E. In this particular example, the fourth environment template 142D defines a 2D environment with a grid layout of 2D video feeds of select users. The select users can be active speakers, e.g., users are displayed when a threshold volume is detected from their microphone. In this example, a UI object 211Q is positioned with an active speaker and users displayed within the grid can be secondary speakers, e.g., in queue for taking the stage or people that are speaking concurrently with the participant displayed in the active region 211Q. The fourth environment template 142D also defines a region for displaying a thread 211M for all users to participate.

In this example, the fourth environment template 142D also defines parameters that controls the audience audio to a medium level and controls the thread to allow any of the users to post messages to the thread 211M. These levels can be established from an interpretation of the fourth agenda item. The system can identify from the description that the video gird is to be shared with all users and the discussion is to be facilitated using voice and chat. Thus, the system can modify the permissions and volume level accordingly.

Figure 2C:
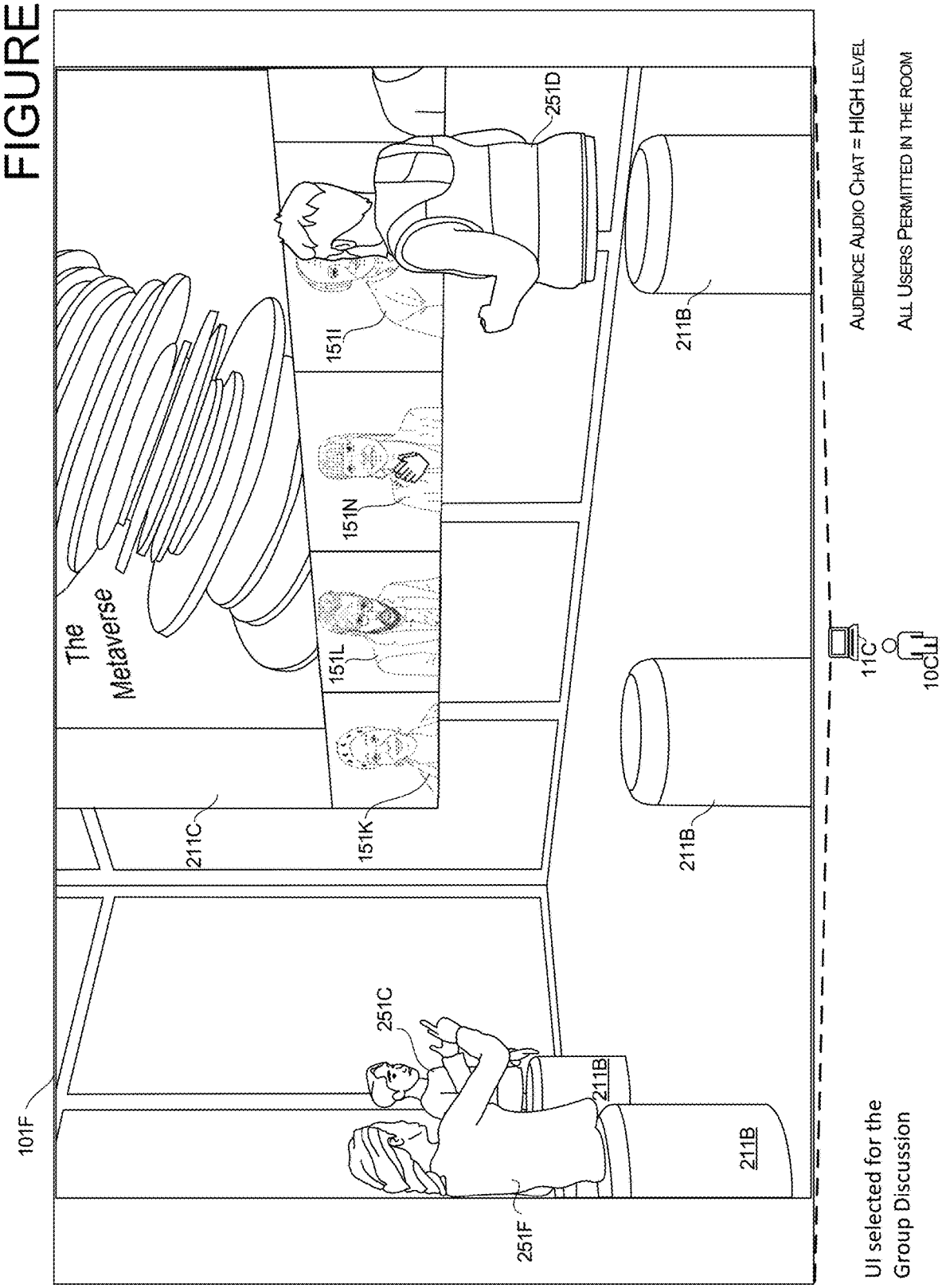
FIG. 2C illustrates an example of a user interface environment that can be utilized for a meeting agenda item that includes a group discussion session.

FIGS. 2A through 2C illustrate an example of how a system 100 can analyze contextual data 115, e.g., a second agenda 115, for the purposes of selecting various user interface environment templates 141 to generate a collection of selected environment templates 142. The system then manages the flow of an event, such as a meeting, by causing a display of the selected environment templates 142 in a manner that is consistent with the order of the contextual data. In this example, the agenda 115 includes two agenda items: a presentation where a single person is acting as a presenter and the user shares a file having a particular filetype, e.g., a slide deck; and a group discussion where the agenda indicates that devices of different users can select different environments based on their device type.

Based on this agenda 115, the system selects two environment templates 142 from a collection of environment templates 141. In this example, a fifth selected template 142E includes a 3D environment for a conference room with a podium for a single user, a sixth selected template 142F includes a hybrid 2D and 3D environment. Each selected template 142 can be used by the system to generate renderings of user interface environments that can dynamically change as the system tracks and manages the meeting using the agenda.

Turning now to FIG. 2B in conjunction with FIG. 2A, aspects of a first agenda item 131A for the second example agenda and the fifth environment template 142E are described. For illustrative purposes, consider an example scenario where fifth environment template 142E is associated with particular keywords such as "presenter," "single presenter" and "slide deck." Using this example data, the system can analyze the first agenda item 131A for the second example agenda and select the fifth environment template 142E based on the fact that the fifth environment template is associated with keywords that have a threshold match with the first agenda item 131A for the second example agenda. In response to selecting a particular environment template 142E for the first agenda item 131A for the second example agenda, the system can generate data that links the selected environment template 142E with the first agenda item 131A for the second example agenda.

Using the link associating the fifth environment template with the first agenda item 131A for the second example agenda, when the system starts the meeting using the first agenda item 131A for the second example agenda, the system can cause each of the client computers to display a user interface arrangement based on the fifth environment template 142E. An example of a fifth user interface arrangement 101E that is rendered using definitions of the fifth environment template 142E is shown in FIG. 2B.

In this particular example, the fifth environment template 142E defines a 3D environment having a location for a single presenter and a region for displaying shared content. In this example, the 3D environment includes a virtual object 211G in the form of a podium and another virtual object 211H in the form of a virtual display screen. The template can also indicate locations of representations of each user. For instance, the primary speaker, represented by an avatar 251A, can be positioned by the virtual podium. The audience members who are displayed as other representations 251C, 251C, 251D, and 251H, can be positioned in a region designated for audience members. Each audience member could also be oriented toward the shared content. In this example, the fifth environment template 142E also defines parameters that controls the audience audio stream to a low volume level relative to the volume of an audio stream of the presenter. These levels can be established from an interpretation of the first agenda item 131A for the second example agenda.

Turning now to FIG. 2C in conjunction with FIG. 2A, aspects of a second agenda item 131B for the second example agenda and the sixth environment template 142F are described. For illustrative purposes, consider an example scenario where sixth environment template 142F is associated with particular keywords such as "presenter," "single presenter" and "slide deck." Using this example data, the system can analyze the second agenda item 131B for the second example agenda and select the sixth environment template 142F based on the fact that the fifth environment template is associated with keywords that have a threshold match with the second agenda item 131B for the second example agenda. In response to selecting a particular environment template 142E for the second agenda item 131B for the second example agenda, the system can generate data that links the selected environment template 142E with the second agenda item 131B for the second example agenda.

Using the link associating the sixth environment template 142F with the second agenda item 131B for the second example agenda, when the system transitions the meeting from the first agenda item of the second example agenda (FIG. 2A) to the second agenda item 131B for the second example agenda, the system can cause each of the client computers to display a user interface arrangement based on the sixth environment template 142F. An example of a sixth user interface arrangement 101F that is rendered using definitions of the sixth environment template 142F is shown in FIG. 2C.

In this particular example, the sixth environment template 142F defines a hybrid 2D and 3D environment. This template allows users to select how they want to appear in the environment: each user can appear as a 2D rendering of an image 151, or each user can appear as a rendering of 3D representation, e.g., appear as an avatar. In this example, the 2D images of individual users are rendered on a virtual screen within the three dimensional environment.

The system can allow users to select a particular rendering type, e.g., 2D or 3D, or the system can select a particular rendering type based on a device type of each user. For instance, if a first user is utilizing a head-mounted display, the system can still allow that user to provide an input to appear as a 2D image, e.g., rendering 151K, which can include a rendering of a still image of that user. Alternatively, the system may select a rendering type based on the device type for a user. For instance, if a second user utilizing a head-mounted display, the system can cause that user to appear as a 3D representation 251. This environment may also include various objects such as furniture 211B and a display screen 211C. Each user can transfer between the rendering type by providing an input. For instance, a first user can appear as a 2D image and then provide an input to transfer to a 3D representation. This template also provides the ability for users to chat at a suitable volume. system permissions can be configured based on the template and allow users to move throughout the virtual room.

FIGS. 3A through 3D illustrate another example of how a system 100 can analyze contextual data, e.g., a third agenda 115, for the purposes of selecting various user interface environment templates 141 to generate a collection of selected environment templates 142. The system then manages the flow of an event, such as a meeting, by causing a display of the selected environment templates 142 in a manner that is consistent with the order of the agenda. In this example, the agenda 115 includes three agenda items: a presentation to be performed by four people, a group discussion where the agenda indicates that devices of the users can select different rendering types, e.g., 3D vs 2D, and a Q&A session.

Based on this example agenda 115, the system selects three environment templates 142 from a collection of environment templates 141. In this example, a seventh selected template 142G includes a 2D rendering showing a video from a conference room camera, an eighth template 142F includes a hybrid 2D and 3D environment involving a grid layout for the 2D renderings and a region reserved for a 3D rendering of a 3D environment 200.

Figure 3B:
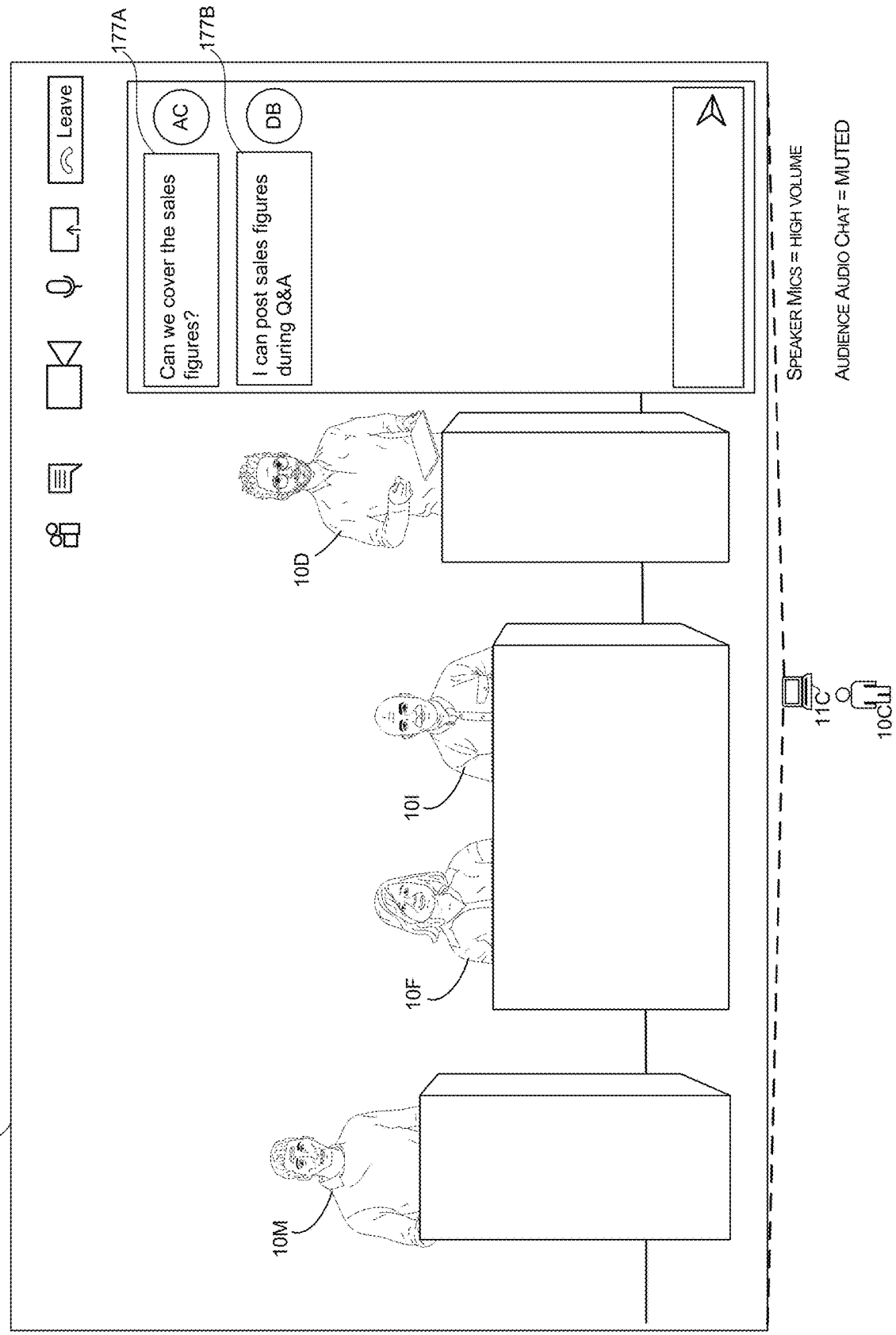
FIG. 3B illustrates an example of a user interface environment that can be utilized for a meeting agenda item that includes a presentation.

Turning now to FIG. 3B in conjunction with FIG. 3A, aspects of a first agenda item 131A for the third agenda 115 and the seventh environment template 142G are described. For illustrative purposes, consider an example scenario where seventh environment template 142G is associated with particular keywords such as "presentation," "multiple presenters" and "multipole slide decks, "room camera." Using this example data, the system can analyze the first agenda item 131A for the third agenda and select the seventh environment template 142G based on the fact that the seventh environment template 142G is associated with keywords that have a threshold match with the first agenda item 131A for the third agenda. In response to selecting a particular environment template 142E for the first agenda item 131A for the third agenda, the system can generate data that links the selected environment template 142E with the first agenda item 131A for the third agenda.

Using the link associating the seventh environment template 142G with the first agenda item 131A for the third agenda, when the system starts the meeting using the first agenda item 131A for the third agenda, the system can cause each of the client computers to display a user interface arrangement based on the seventh environment template 142G. An example of a seventh user interface arrangement 101G that is rendered using definitions of the seventh environment template 142G is shown in FIG. 3B.

In this particular example, the seventh environment template 142G defines a 2D environment that is generated from a camera of a conference room. The seventh environment template 142G can indicate that the room camera is directed to several podiums with a panel desk. In addition, the seventh environment template 142G can be associated with a room number. Thus, when the agenda has a reference to the same room number, the system can select the seventh environment template 142G as the selected template for this agenda item. The template can also include parameters for controlling the audio channels of the communication session. In this example, the system can select a template with the appropriate audio settings or generate parameters based on an interpretation of the agenda items. In this case, the template is configured to mute all audience members and allow the multiple presenters to provide a speech input to the communication session. The seventh environment template 142G can also define parameters for a chat message thread. The template 142G can have parameters that control the system to allow each person to send and receive messages for the displayed thread. All of the definitions of the 7th environment template are used to generate the user interface arrangement shown in FIG. 3B.

Figure 3C:
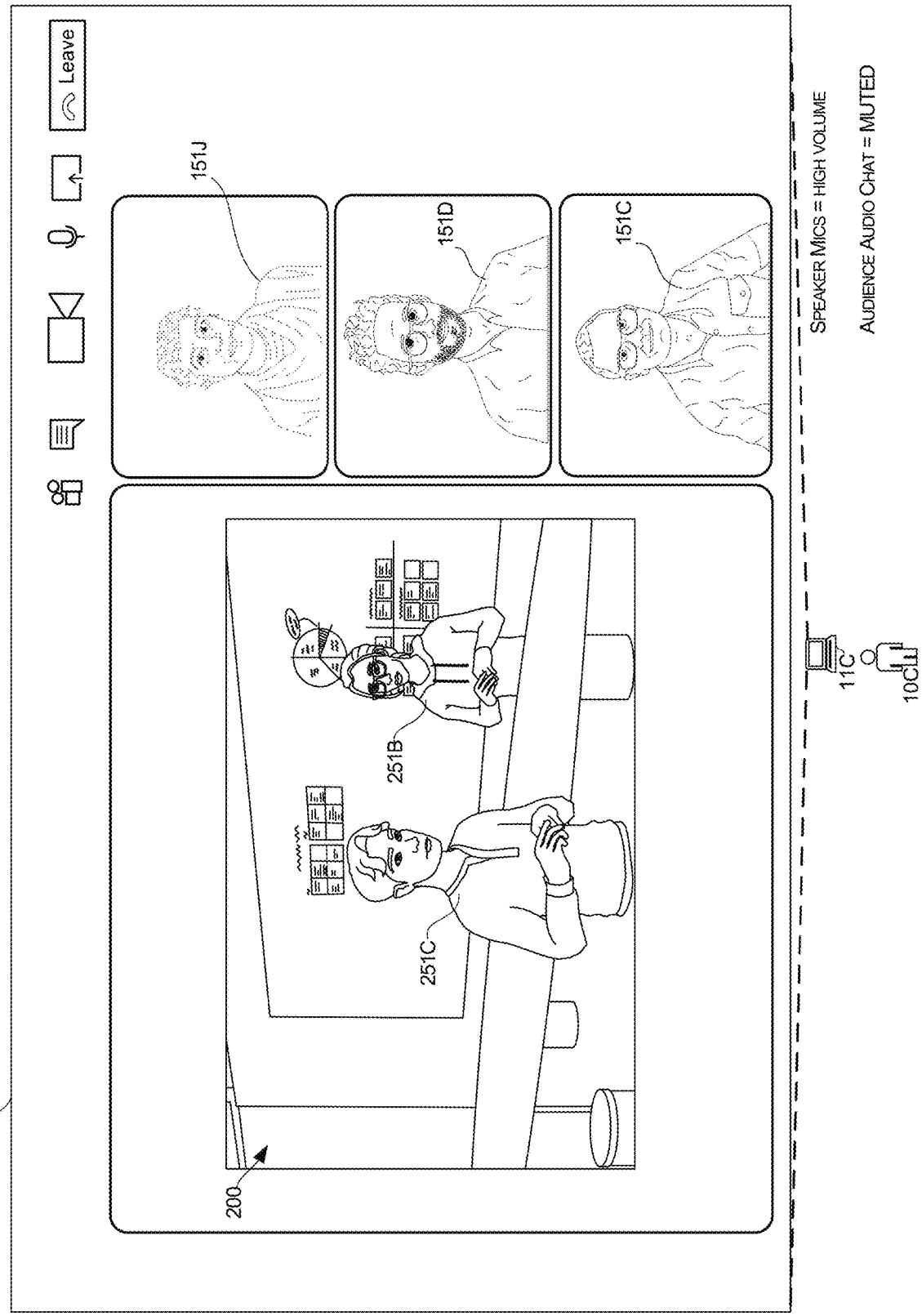
FIG. 3C illustrates an example of a user interface environment that can be utilized for a meeting agenda item that includes a group discussion.

Turning now to FIG. 3C in conjunction with FIG. 3A, aspects of a second agenda item 131B for the third example agenda and the eighth environment template 142H are described. For illustrative purposes, consider an example scenario where eighth environment template 142H is associated with particular keywords such as "group" and "discussion." Using this example data, the system can analyze the second agenda item 131B for the third example agenda and select the eighth environment template 142H based on the fact that the eighth environment template is associated with keywords that have a threshold match with the second agenda item 131B for the third example agenda. In response to selecting a particular environment template 142E for the second agenda item 131B for the third example agenda, the system can generate data that links the selected environment template 142E with the second agenda item 131B for the third example agenda.

Using the link associating the eighth environment template 142H with the second agenda item 131B for the third example agenda, when the system transitions the meeting from the first agenda item of the third example agenda (FIG. 3A) to the second agenda item 131B for the third example agenda, the system can cause each of the client computers to display a user interface arrangement based on the eighth environment template 142H. An example of an eighth user interface arrangement 101H that is rendered using definitions of the eighth environment template 142H is shown in FIG. 3C.

In this particular example, the eighth environment template 142H defines another hybrid 2D and 3D environment. This template allows users to select how they want to appear in the environment: each user can appear as a 2D rendering of an image 151, or each user can appear as a rendering of 3D representation, e.g., appear as an avatar. In this example, participants who are displayed as 3D renderings are positioned within a view of a 3D environment 200. Participants who are displayed as 2D images are positioned in a grid layout where each 2D images is positioned in proximity to the view of a 3D environment 200.

The system can allow users to select a particular rendering type, e.g., 2D or 3D, or the system can select a particular rendering type based on a device type of each user. For instance, if a first user is utilizing a head-mounted display, the system can still allow that user to provide an input to appear as a 2D image, e.g., rendering 151J, which can include a rendering of a still image of that user. Alternatively, the system may select a rendering type based on the device type for a user. For instance, if a second user utilizing a head-mounted display, the system can cause that user to appear as a 3D representation 251. This environment may also include various virtual objects such as virtual furniture. Each user can transfer between the rendering type by providing an input. For instance, a first user can appear as a 2D image and then provide an input to transfer to a 3D representation. This template also provides the ability for users to chat at a suitable volume. system permissions can be configured based on the template and allow users to move throughout the virtual room.

Figure 3D:
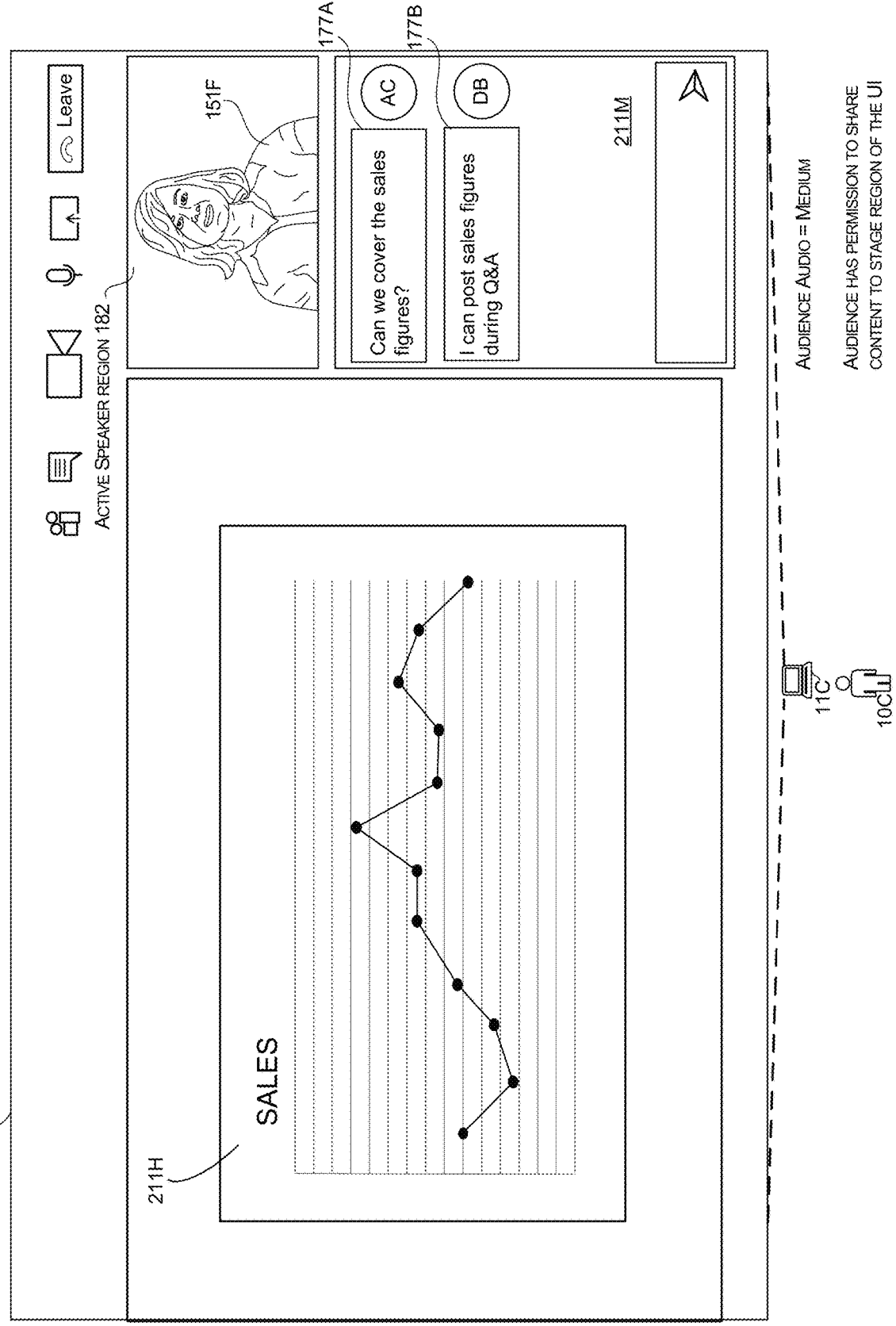
FIG. 3D illustrates an example of a user interface environment that can be utilized for a meeting agenda item that includes a Q&A session.

Turning now to FIG. 3D in conjunction with FIG. 3A, aspects of a third agenda item 131C for the third example agenda and the nineth environment template 142I are described. For illustrative purposes, consider an example scenario where nineth environment template 142I is associated with particular keywords such as "Q&A" and "question and answer." Using this example data, the system can analyze the third agenda item 131C for the third example agenda and select the nineth environment template 142I based on the fact that the nineth environment template is associated with keywords that have a threshold match with the third agenda item 131C for the third example agenda. In response to selecting a particular environment template 142E for the third agenda item 131C for the third example agenda, the system can generate data that links the selected environment template 142E with the third agenda item 131C for the third example agenda.

Using the link associating the nineth environment template 142I with the third agenda item 131C for the third example agenda, when the system transitions the meeting from the second agenda item of the third example agenda (FIG. 3A) to the third agenda item 131C for the third example agenda, the system can cause each of the client computers to display a user interface arrangement based on the nineth environment template 142I. An example of a nineth user interface arrangement 101H that is rendered using definitions of the nineth environment template 142I is shown in FIG. 3D.

In this example, the nineth environment template 142I defines 2D interface that provides a region 182 for an active speaker and a display object 211M that is configured to display a message thread. In addition, based on an interpretation of the agenda item, the system can also allow audience members to share content and display the shared content on a primary region of the user interface. The system can set permissions during this meeting segment to allow users to conduct a voice chat and a message chat. Users can take turn using the primary display area for the shared content.

FIG. 4 shows examples of data structures for two environment templates 141. In general, an environment template 141 contains definitions for a particular collaboration environment. For example, a template can determine a type of an environment, e.g., whether a displayed environment is based on a three-dimensional model or whether a displayed environment is based on two dimensional images. Each template can include attributes for displayed objects, which can include 3D objects and 2D objects to be displayed in a corresponding user interface. Each attribute can include a position size and orientation for each object and each attribute can also define a shape for each object. For example, for a 3D environment, one attribute can define a virtual chair another attribute can define aspects of a virtual display screen. For a 2D environment, one attribute can define aspects of a display window. Each template can also be associated with metadata 401 that includes keywords, activity categories, phrases or other forms of data that can be utilized by the system to identify a particular template for a given agenda item. For instance, the first template can have a first set of metadata 401A that includes keywords or activity categories such as "social gathering," and the second template can have a second set of metadata 401B that includes keywords or activity categories such as "video share."

Although these examples illustrate a specific order in which templates are selected, it can be appreciated that any of the templates can be applied to any agenda item, in any order. In addition, These examples are provided for illustrative purposes and are not to be construed as limiting. It can be appreciated the techniques disclosed herein can apply to any template that can be selected for any particular agenda item. Any template having any combination of 2D and 3D features can be applied to the techniques disclosed herein.

Figure 5:
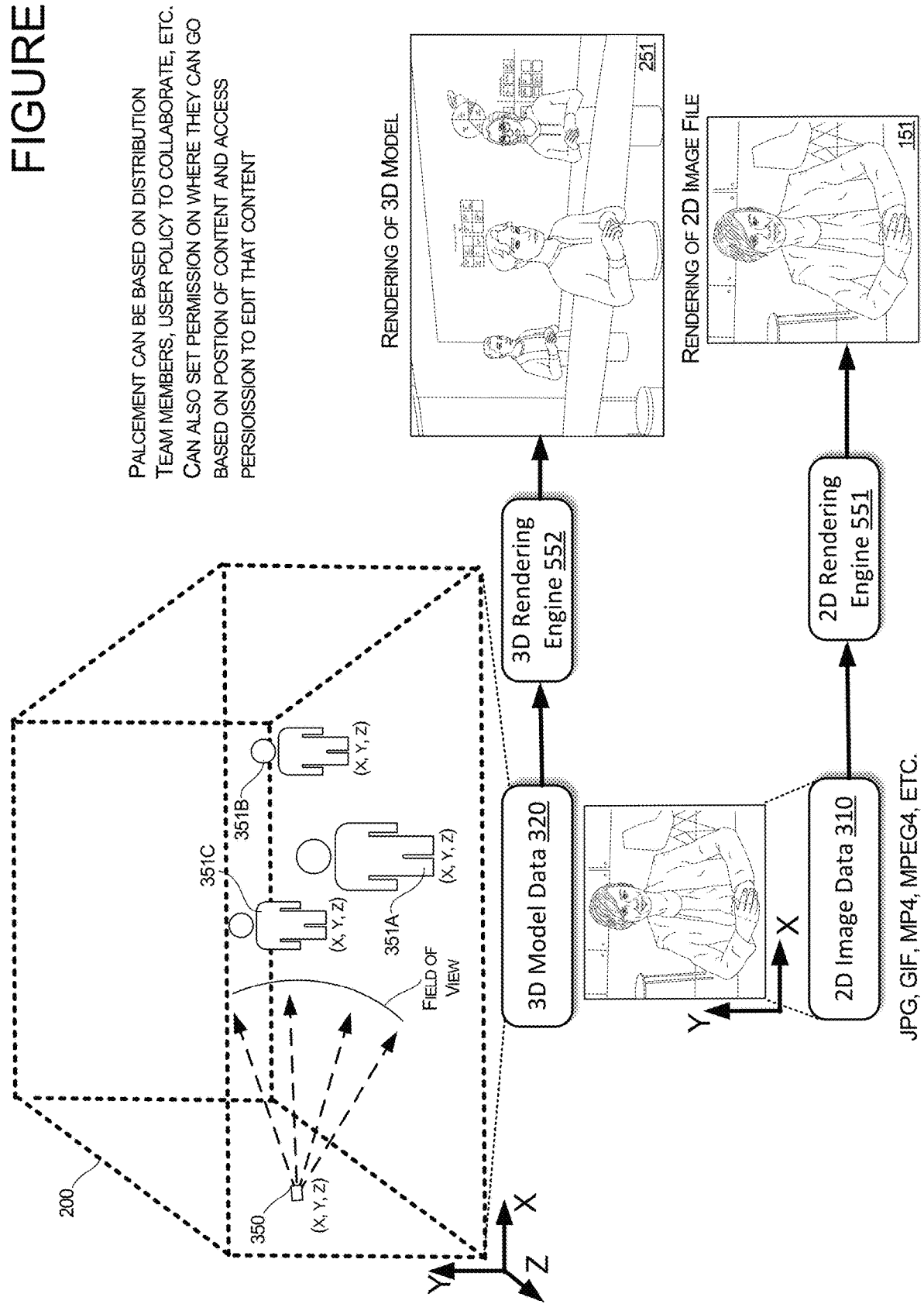
FIG. 5 illustrates aspects of a 2D and 3D environment disclosed herein.

FIG. 5 illustrates additional features of the UI transition. In some embodiments, when an input is received for causing the UI transition from a rendering of the 2D image of the user 10C to a rendering of a 3D representation of the user 10C, the system can determine a location and orientation for the 3D representation of the user 10C. For instance, if a template defining A3 dimensional environment is utilized to display a number of user renderings, the system can determine a location and orientation of all virtual objects 351C representing a user. In this example, when an input indicates that a particular user, such as the third user 10C, the system can determine a location and orientation of the virtual object 351C representing the third user 10C based on the location of other users and/or the location of shared content within the virtual environment 200.

In one illustrative example, if the system determines that that a virtual object 351C used to represent the third user 10C is to be added to the virtual environment 200, the system can position the virtual object 351C in a way such that the virtual object 351C gives the appearance that the user's avatar is looking at content that is shared with the user 10C. In another example, if the system determines that that a virtual object 351C used to represent the third user 10C is to be added to the virtual environment 200, the system can position the virtual object 351C in a way such that the virtual object 351C gives the appearance that the user's avatar is looking at avatars of user's that are talking to the user 10C. As described herein, the system positions the person's avatar such that the avatar does not block other user's from viewing content and/or the system positions the person's avatar is directed toward salient information being shared within the virtual environment.

In some embodiments, placement of each virtual object 351 can be based on distribution of team members, user groups, and/or policies established by individual users or groups of users. For instance, if a person is part of a team within a corporation, when one of those individuals is identified in an input for transitioning the user interface, their corresponding avatar will be positioned within a threshold distance of other team members. The orientation of that user's avatar can be based on an analysis of the orientation of the avatars of their team members. For instance, if a threshold number of users within a team are looking at content, that user's avatar entering a 3D environment can be oriented to look at the content as well. The system can also configure permissions. For instance, when a particular user's avatar enters a 3D environment, and a threshold number of teammates are looking at content, the system may also provide access permissions for allowing that user to access that content. When the user leaves the 3D environment, that access can be revoked. A person's permissions may also mirror the permissions of other people in the 3D environment. For instance, if other users of a team are able to edit content, a user on that team may also get editing rights for the time that they have an avatar in the 3D environment.

FIG. 5 also shows aspects of a system configured to implement the techniques disclosed herein. For illustrative purposes, a rendering of a 2D image file or a rendering of a 2D image of a user can be generated by a 2D rendering engine 551 receiving 2D image data 310, e.g., an image file. A rendering of a 2D image file can include a 2D environment, e.g., the background of an image, and a 2D object, e.g., an image of a person or an avatar. The image file, e.g., image data 310, can have pixels arranged in two dimensions, e.g., pixels arranged within a two-dimensional coordinate system (x, y). This data can also be referred to herein as a two-dimensional model that is based on a two-dimensional coordinate system. Each part of an image can be a pixel or any other geometric shape, such as a triangle. For instance, a group of pixels or triangles can be used to generate a rendering of a two-dimensional avatar of a user, or a live video image of a person.

A two-dimensional environment having a number of 2D images of participants of a communication session is also referred to herein as a "grid environment." Image data or a communication data stream can define a two-dimensional environment or a two-dimensional object, and that two-dimensional environment can be rendered on a display screen. The rendering can be referred to herein as a two-dimensional rendering of a two-dimensional environment or a two-dimensional rendering of a two-dimensional object. This is also referred to herein as a "rendering of the two-dimensional image."

For illustrative purposes, a rendering of a 3D model or a rendering of a 3D representation of the user can be generated by a 3D rendering engine 552 accessing 3D model data 320, e.g., a 3D model. A 3D model can include parameters defining a 3D environment 200, e.g., a model of a room, and parameters defining 3D objects, e.g., size, shape, and position data for representations 351 of users or other virtual objects. A three-dimensional environment is a computing environment model that is based on a three-dimensional coordinate system. Attributes of the three-dimensional environment and three-dimensional objects in the three-dimensional environment are based on components that are positioned within a three-dimensional coordinate system (x, y, z). Each component can be a triangle or any other geometric shape. Each of the components can have a position, e.g., a location in the three-dimensional coordinate system, as well as an orientation, e.g., a direction in which a triangle is pointed. For instance, a group of triangles can be used to generate a rendering of a three-dimensional avatar of a user or a three-dimensional rendering of a three-dimensional object.

A three-dimensional environment is also referred to herein as an "immersive environment." Model data or a three-dimensional model can be included in a communication data stream and the model data can define a three-dimensional environment. That three-dimensional environment can be based on a three-dimensional coordinate system. When the rendering engine 552 generates a 3D rendering from a 3D model, that rendering is generated from a reference point in the environment, e.g., a perspective having a position relative to the virtual environment. for illustrative purposes, a reference point is also referred to herein as a virtual camera 350. That camera can have a field of view which is used to generate a rendering of a 3D environment or a 3D object based on the position of the virtual camera 350. The rendering of a three-dimensional object in the three-dimensional environment is based on a position and orientation of the three-dimensional object and the position of the virtual camera 350.

In some embodiments, two-dimensional images can be displayed within a three-dimensional environment. This can occur, for instance, when a communication system receives a two-dimensional video stream of a user, but participants receiving that video stream are viewing a 3D environment with HMDs. This may cause the system to show the image of that user on as if they are appearing on a virtual television on the wall of the virtual environment. This is referred to herein as a two-dimensional rendering of a user within a three-dimensional environment. This can include the users shown in FIG. 2C as 2D renderings on the virtual screen 211C.

In some embodiments, a three-dimensional environment and three-dimensional objects defined by a three-dimensional model can be displayed as a two-dimensional rendering. This can occur, for instance, when a communication session involves a user interface that shows two-dimensional images, e.g., when Teams is in Grid Mode. While in this mode, the system may need to display images of users interacting in a 3D environment. In this instance, a 2D image of the 3D environment is displayed from a particular position, e.g., a virtual camera position, and that 2D image is displayed within one of the grids. This rendering can be referred to herein as a two-dimensional rendering of a three-dimensional environment. To achieve a two-dimensional rendering of a three-dimensional environment, model data defining a three-dimensional environment can be projected using a transform. The transform can generate the rendering such that the width, height, and depth of a three-dimensional object can be expressed on a flat screen using vector projections from a model of the object to a point of view, e.g., a virtual camera position.

Figure 6:
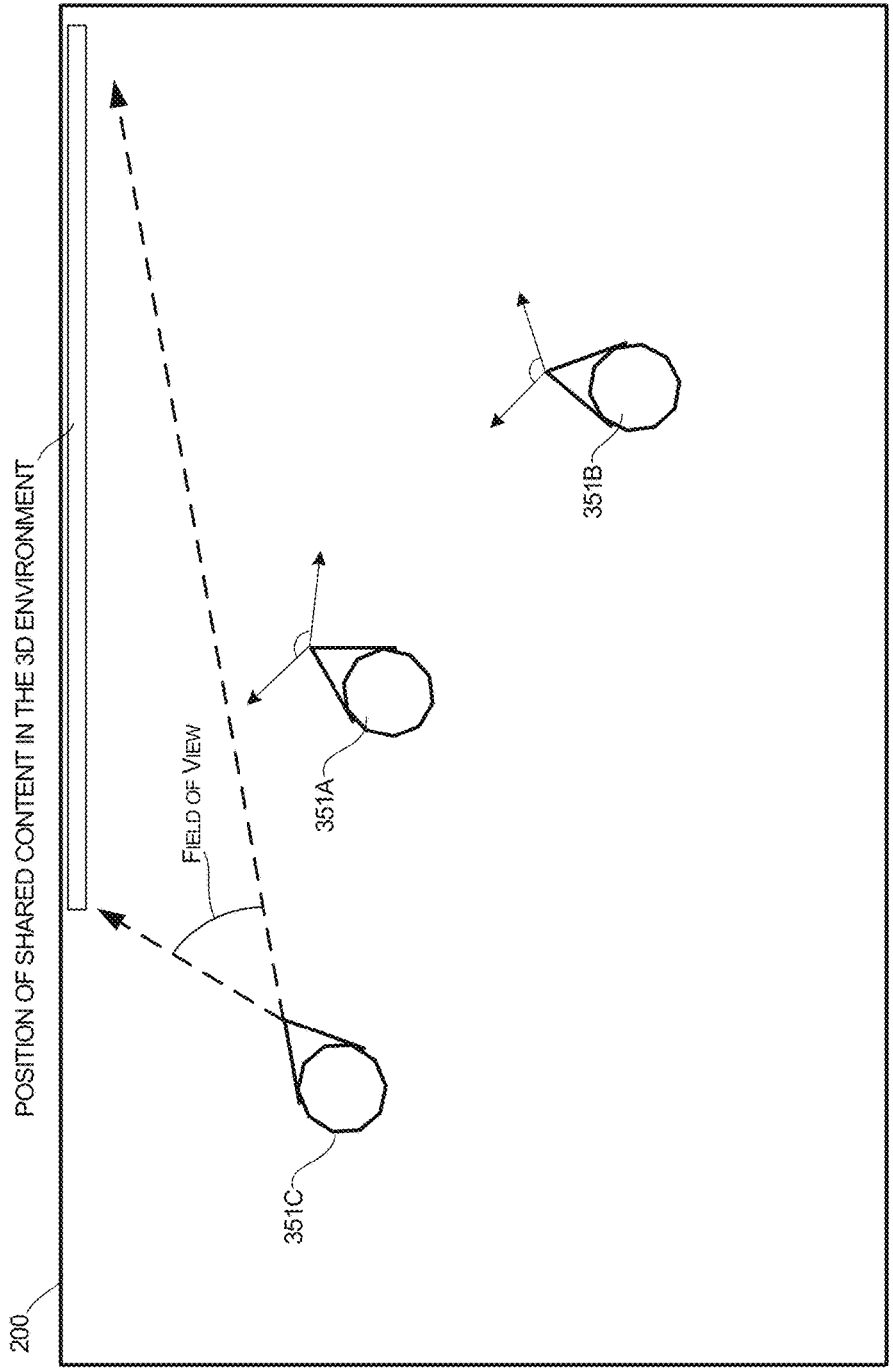
FIG. 6 illustrates a first example scenario where a system determines positions and orientations for various avatars that are added to an environment of a template based on a virtual object such as a virtual display screen.

FIG. 6 illustrates features of a system configured for positioning a representation of a user within a 3D environment 200 relative to shared content. These figures illustrate a top view of a 3D environment 200. In this example, when avatars of the users are added to a 3D environment, the system can select a position and orientation for each avatar. In some embodiments, when a template and corresponding agenda item includes shared content, the system can place each avatar in the environment such that they are appearing to look at shared content. In addition, the system can distribute the position of each avatar evenly within an area such that they do not interrupt the field of view of other users.

Figure 7:
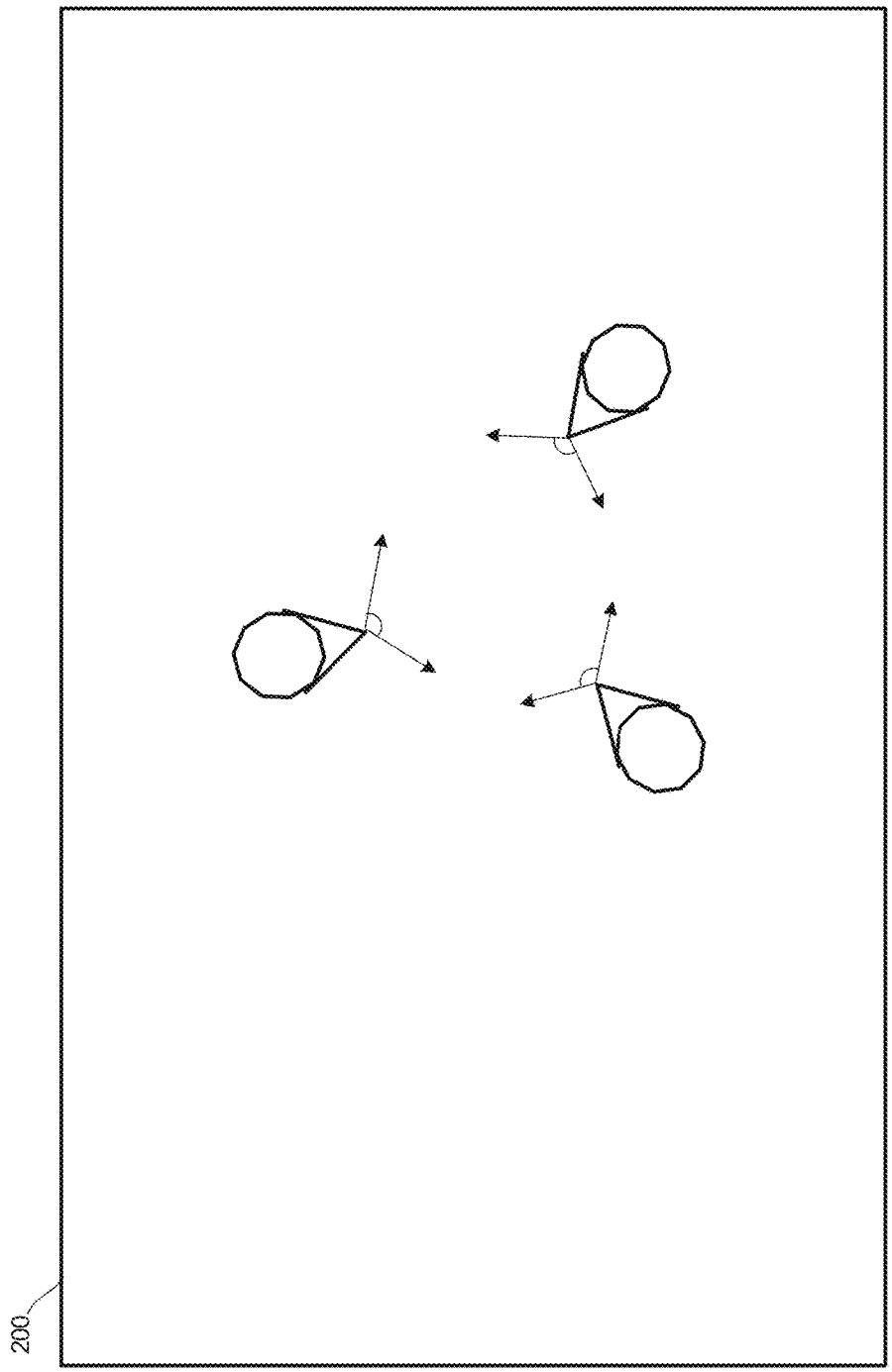
FIG. 7 illustrates a second example scenario where a system determines positions and orientations for various avatars that are added to an environment of a template based on the position of one another.

FIG. 7 illustrates features of a system configured for positioning a representation of a user within a 3D environment 200 relative to other users. In this example, when avatars of the users are added to a 3D environment, the system can select a position and orientation for each avatar. In some embodiments, when a template and corresponding agenda item does not include shared content, the system can place each avatar in the environment such that they are looking at one another. This embodiment may also be used when an agenda item calls for a social gathering, regardless of the presence of shared content.

Figure 8:
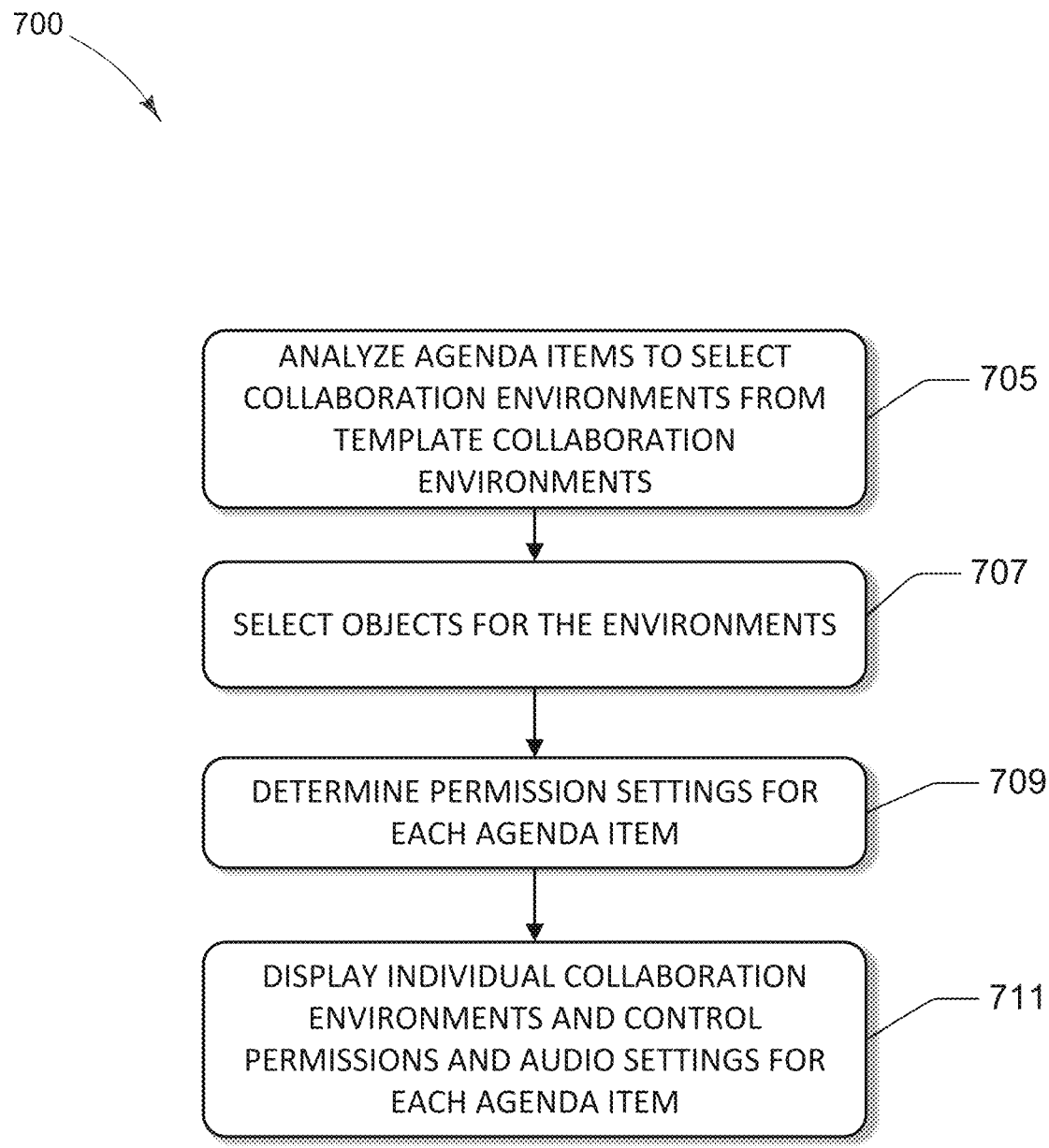
FIG. 8 is a flow diagram showing aspects of a routine that enables systems select and control the display of user interface environments.

FIG. 8 is a diagram illustrating aspects of a routine 700 for providing transitions of a user interface arrangement from a display of a two-dimensional image of a user to a rendering of a three-dimensional representation of the user while the user is participating in a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 705 where the system analyzes an agenda having agenda items. In some configurations, the system can analyze an agenda to determine a match with a particular environment template. Although the disclosed techniques show examples where keyword matching is utilized for identifying a particular template, it can be appreciated the other methods for identifying a template based on an analysis of text of an agenda may be used. In addition to contextual matching between an agenda item and a template, other factors may be utilized to select a template. For instance, the existence of shared content, the data type of the shared content, a number of participants, and/or titles of participants, can all be utilized to identify and select an environment template.

Although the examples disclosed herein select environment templates based on word matches, it can be appreciated that other algorithms including machine learning techniques can be utilized to select certain templates. For instance, the system may analyze the content that's shared between the users such as a CAD file of a building in Switzerland and automatically create a template using that CAD file. The template can include a structure that's based on a CAD file and also place that structure within a rendering of a particular location. For instance, if a CAD file defines an architectural design for a building that is intended to be built in Switzerland, the system can generate a 3D rendering of the building defined in the CAD file and also obtain other scenery information from public resources, such as a map program or site, and render the building using a combination of the CAD file contents and the contents of the map resources. In this example, the glass atrium that is defined in the shared content is rendered with a mountain scene from the Swiss Alps.

In some embodiments, each virtual object 211 and/or the templates can also be selected based on a number of attendees, an event type, a device type of certain users, and/or a type of shared content. For example, an event type that includes a social gathering may cause the system to select a specific room sized for a number of people and also cause the system to select more tables and chairs instead of selecting more virtual display screens. An event type that includes a presentation of specific content, such as a financial report, may cause the selection of a template that includes a 2D environment that provides a live stream of the presenter and a rendering of the content. However, an event type that includes a presentation of an architectural design of a building, may cause the selection of a template that includes a 3D environment that allows each person to control avatars to navigate throughout the building. An event type that includes a single presenter who is not sharing a live video based on their device type, may cause a system to select a template defining a 3D environment using an avatar that is controlled by the audio signal of the presenter. In addition, the selected template environment may also be configured to only include one virtual display screen for the solo presenter. If the event includes multiple presenters, the selected template environment may be configured to with multiple virtual display screens.

At operation 707, the system can select objects for the selected environment templates. Objects can be based on a number of different factors including the number of people per role, a number of attendees, parameters on shared content, etc. For instance, a number of virtual chairs can be placed based on a number of attendees in a meeting. The system may also determine a number of virtual screens or display regions for shared content depending on the number of speakers for a presentation. The system may also select promotional objects such as signs and background scenery.

At operation 709, the system may determine permissions for each user for each agenda item. For instance, shared content of a presentation may not be shared with audience members until the presentation begins. Thus, during other agenda items such as a meet and greet, users may not have access to shared content.

The system can also analyze each agenda item to identify descriptions that indicate audio and video preferences. For example, in the second agenda item states that All Users can participate in voice and text communication. The system can interpret this description and modify permissions of the system to utilize a particular operating mode during the segment of the meeting related to the second agenda item. Thus, the system can generate a set of permissions that control each user's volume, both incoming and outgoing volumes, and permissions for allowing or restricting the communication of text messages. In this example, the second agenda item includes a description that can be interpreted by the system to cause the execution of one or more operations to share videos for all users during the segment as well as allow users to communicate using voice and text comments.

As described herein, the system can interpret preferences from text in each agenda item and modify permissions of each user and/or an operating state of a system for each segment of a meeting. For instance, the system may interpret an instruction to share a video and allow discussion to control the volume of each user for allowing a discussion between the users during the playback of the video. By interpreting this goal of the meeting segment, the system can control volume of content as well as control volume of a speech audio during a particular segment. Thus, in addition to providing the appropriate visual arrangement, e.g., selecting 3D or 2D user interfaces, the system can control audio and video permissions to allow or restrict users to share content, communicate via voice signals, text messages, etc.

At operation 711, the system can manage the timing of a meeting by causing user interface transitions between each template as a meeting progresses through an agenda. As shown in the progression of the user interface arrangements disclosed herein, the system can control a start time and end time of a particular meeting agenda item.

The routine can also include operations for analyzing an agenda (115) of a communication session to select collaboration environments (142) to be used to generate user interface arrangements (101) for each agenda item (131). This includes analyzing the agenda and selecting an environment, using a "type" of activity. For instance, the system can analyze the agenda (115) having individual agenda items (131) for a communication session, wherein the agenda (115) is analyzed to determine an activity category for each agenda item.

The system can determine an activity category for each agenda items, for instance by analyzing the text of an agenda item, the system may determine a type of activity such as a review of a Financial Report, a Brainstorming session, or a social gathering. Once a system determines a category for agenda item, e.g., by using keywords or other methods for interpreting the text of an agenda item, the system can select individual collaboration environments from a plurality of template collaboration environments for each agenda item based on the activity category that is determined for each agenda item. This determination can be made by analysis of the text of the agenda item or shared content associated with an agenda item. If a particular agenda item has keywords that are related to a predetermined activity type, and that predetermined activity type is included in, or associated with, a particular environment template, such as the keywords shown in each template of FIG. 4, the system may select that particular environment template for that particular agenda item.

Figure 10:
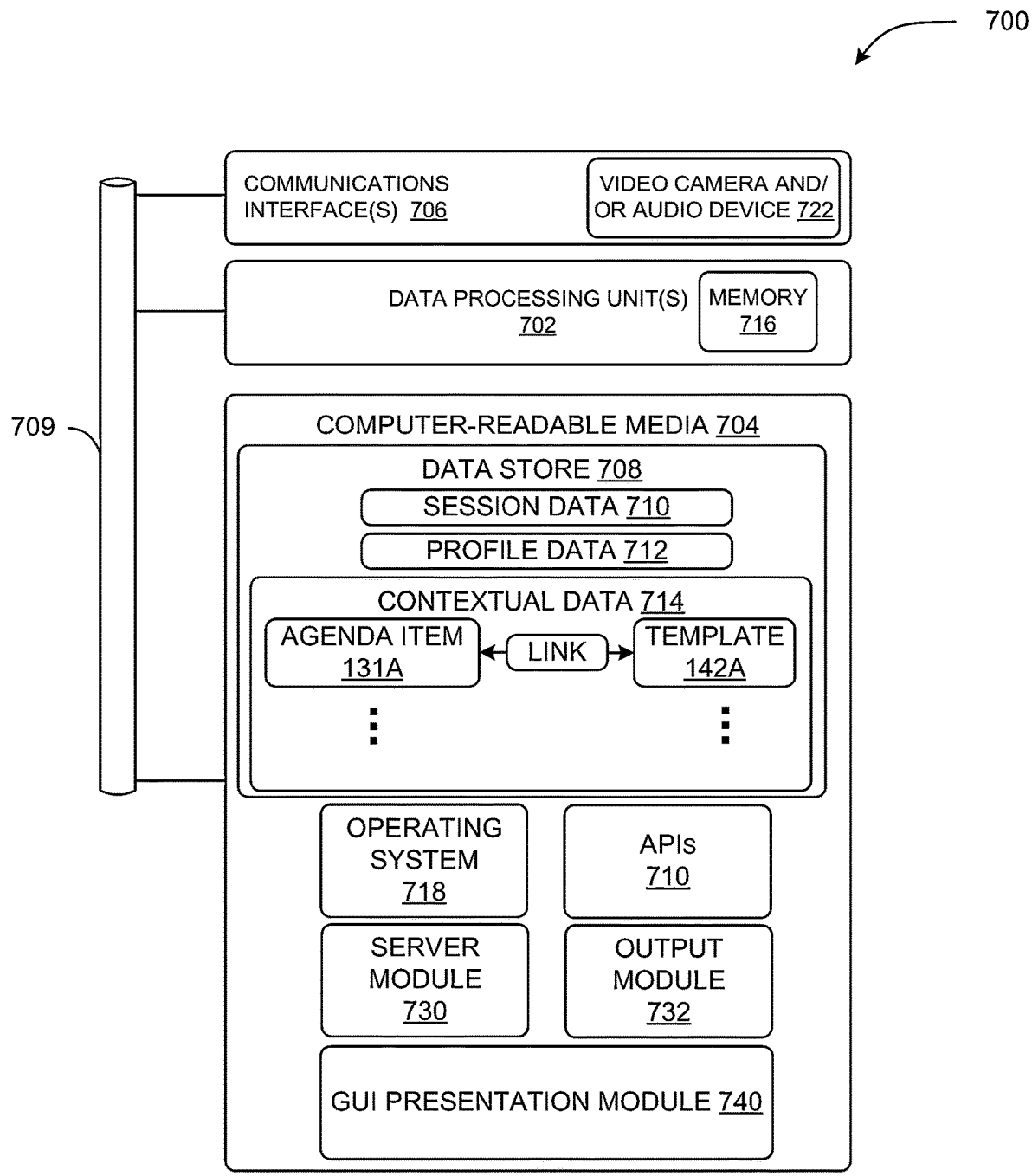
FIG. 10 is a computer architecture diagram illustrating a computing device architecture for a computing device capable of implementing aspects of the techniques and technologies presented herein.

The system can also generate a data structure that links the selected environment to the agenda item. For instance, as shown in FIG. 10, the system can generate a data structure (714) that links the individual agenda items (131) with individual collaboration environments (142) that are selected based on the corresponding activity category. The system can then automatically apply the proper environments, each of which can define 2D and 3D constructs for an environment and scenes suitable for corresponding agenda items. The system can then cause a display of individual user interface arrangements (101) on client computers that are based on the individual collaboration environments (142) that are selected using activity categories that are determined for each agenda item. The system can also control transitions of the individual user interface arrangements (101) each using the individual collaboration environments (142) as the communication session progresses through the agenda items (131).

The system can also select environment template is based on shared content. As shown in the examples disclosed herein, the system can analyze shared content that is provided from one or more devices of one or more participants of the communication session to determine a compatibility level between an individual collaboration environment and an individual agenda item, wherein the selection of the individual collaboration environment is based on the compatibility level.

The system can also select environment template is based on user profiles. As shown in the examples disclosed herein, the system can analyze user profiles, which can include titles, background experiences, history of shared documents, of one or more participants of the communication session to determine a compatibility level between the user profiles and an individual collaboration environment. For instance if a particular user has a history of using a particular 3D user interface for editing a file, the system can select that collaboration environment for that user. In some configurations, the selection the collaboration environment, e.g., environment template, can be based on a compatibility level between the user profiles and the individual collaboration environment. For illustrative purposes, a collaboration environment is also referred to herein as an environment template, as both can define aspects of a user interface.

In addition, if a system shows that all users having a particular level or rank in a company must work with a particular collaboration environment, the system may select that particular collaboration environment for users having the appropriate rank or corporate level.

The system can also select environment template is based on a number of participants in a meeting. As shown in the examples disclosed herein, the system can analyze a number of participants in a meeting and select a collaboration environment that is suitable for that number of participants. For instance, if a large audience is participating in a meeting, this system may pick an auditorium. If only several people are participating in a meeting, the system may select a small office room. The system can analyze a number of participants of the communication session to determine a compatibility level between the number of participants and an individual collaboration environment, wherein the selection of the individual collaboration environment is based on the compatibility level between the number of participants and attributes of the individual collaboration environment. If a particular environment has a threshold compatibility level with a particular audience size, that environment may be selected.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
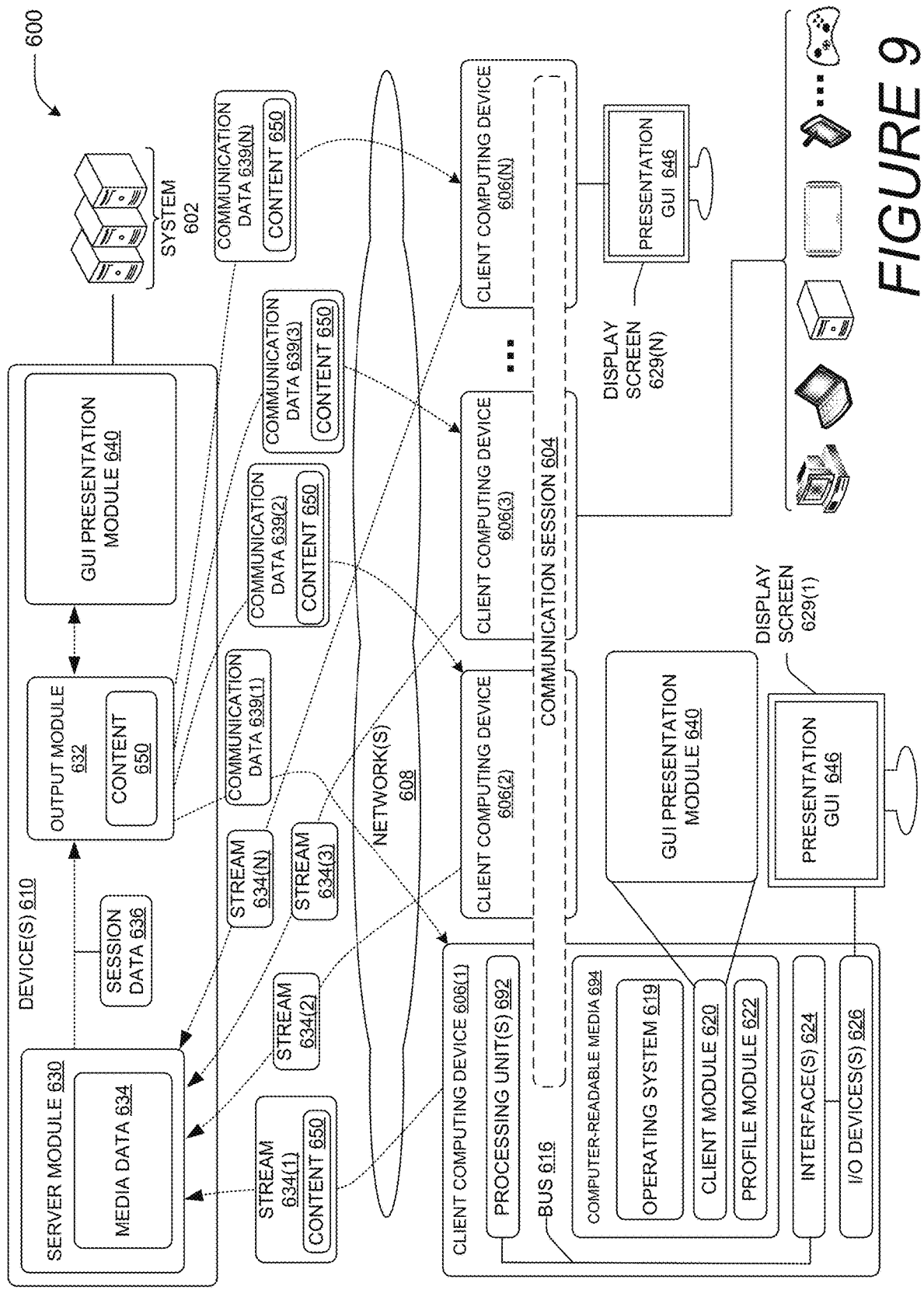
FIG. 9 is a computer architecture diagram illustrating an illustrative computer hardware and software architecture for a computing system capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714. The contextual data can store information such as the links that are generated to associate agenda items with selected environment templates 142.

The contextual data can also include other information, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment. The contextual data can also be utilized to store agendas that are received by users or other data that is needed by this system such as a database of predetermined agenda items or keywords associated with predetermined agenda items.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method for analyzing an agenda of a communication session to select collaboration environments to be used to generate user interface arrangements for each agenda item, the method to be executed on a system, the method comprising:

analyzing the agenda having individual agenda items for a communication session, wherein the agenda is analyzed to determine an activity category for each agenda item;

selecting individual collaboration environments from a plurality of template collaboration environments for each agenda item based on the activity category that is determined for each agenda item;

generating a data structure that links the individual agenda items with individual collaboration environments that are selected based on activity categories of a corresponding agenda item; and causing a display of individual user interface arrangements that are based on the individual collaboration environments that are selected using activity categories that are determined for each agenda item, wherein the system controls transitions between the individual user interface arrangements using the individual collaboration environments as the communication session progresses through the agenda items.

2. The method of claim 1, further comprising, analyzing shared content that is provided from one or more devices of one or more participants of the communication session to determine a compatibility level between an individual collaboration environment and an individual agenda item, wherein the selection of the individual collaboration environment is based on the compatibility level.

3. The method of claim 1, further comprising, analyzing user profiles of one or more participants of the communication session to determine a compatibility level between the user profiles and an individual collaboration environment, wherein the selection of the individual collaboration environment is based, at least in part, on the compatibility level between the user profiles and the individual collaboration environment.

4. The method of claim 1, further comprising, analyzing a number of participants of the communication session to determine a compatibility level between the number of participants and an individual collaboration environment, wherein the selection of the individual collaboration environment is based on the compatibility level between the number of participants and attributes of the individual collaboration environment.

5. The method of claim 1, further comprising, analyzing a number of participants of the communication session to select virtual objects to be positioned within individual collaboration environments, wherein the display of the individual collaboration environments includes at least one of the virtual objects.

6. The method of claim 1, further comprising, analyzing content that is shared from participants of the communication session to select virtual objects to be positioned within individual collaboration environments, wherein the display of the individual collaboration environments includes at least one of the virtual objects.

7. The method of claim 1, further comprising, analyzing shared content that is provided from one or more devices of one or more participants of the communication session to construct a virtual environment for an individual collaboration environment, wherein the display of the individual collaboration environment displays the shared content.

8. A system for analyzing an agenda of a communication session to select collaboration environments to be used to generate user interface arrangements for each agenda item, the system comprising:
   one or more processing units; and
   a computer-readable storage medium having encoded thereon computer-executable instructions to cause the one or more processing units to:
   analyze the agenda having individual agenda items for a communication session, wherein the agenda is analyzed to determine an activity category for each agenda item;
   select individual collaboration environments from a plurality of template collaboration environments for each agenda item based on the activity category that is determined for each agenda item;
   generate a data structure that links the individual agenda items with individual collaboration environments that are selected based on the corresponding activity category; and
   cause a display of individual user interface arrangements that are based on the individual collaboration environments that are selected using activity categories that are determined for each agenda item, wherein the system controls transitions of the individual user interface arrangements using the individual collaboration environments as the communication session progresses through the agenda items.

9. The system of claim 8, wherein the instructions further cause the one or more processing units to analyze shared content that is provided from one or more devices of one or more participants of the communication session to determine a compatibility level between an individual collaboration environment and an individual agenda item, wherein the selection of the individual collaboration environment is based on the compatibility level.

10. The system of claim 8, wherein the instructions further cause the one or more processing units to analyze user profiles of one or more participants of the communication session to determine a compatibility level between the user profiles and an individual collaboration environment, wherein the selection of the individual collaboration environment is based, at least in part, on the compatibility level between the user profiles and the individual collaboration environment.

11. The system of claim 8, wherein the instructions further cause the one or more processing units to analyze a number of participants of the communication session to determine a compatibility level between the number of participants and an individual collaboration environment, wherein the selection of the individual collaboration environment is based on the compatibility level between the number of participants and attributes of the individual collaboration environment.

12. The system of claim 8, wherein the instructions further cause the one or more processing units to analyze a number of participants of the communication session to select virtual objects to be positioned within individual collaboration environments, wherein the display of the individual collaboration environments includes at least one of the virtual objects.

13. The system of claim 8, wherein the instructions further cause the one or more processing units to analyze content that is shared from participants of the communication session to select virtual objects to be positioned within individual collaboration environments, wherein the display of the individual collaboration environments includes at least one of the virtual objects.

14. The system of claim 8, wherein the instructions further cause the one or more processing units to analyze shared content that is provided from one or more devices of one or more participants of the communication session to construct a virtual environment for an individual collaboration environment, wherein the display of the individual collaboration environment displays the shared content.

15. A computer-readable storage medium having encoded thereon computer-executable instructions to cause one or more processing units of a system for analyzing an agenda of a communication session to select collaboration environments to be used to generate user interface arrangements for each agenda item, wherein the instructions to cause one or more processing units of the system to:
   analyze the agenda having individual agenda items for a communication session, wherein the agenda is analyzed to determine an activity category for each agenda item;
   select individual collaboration environments from a plurality of template collaboration environments for each agenda item based on the activity category that is determined for each agenda item;
   generate a data structure that links the individual agenda items with individual collaboration environments that are selected based on the corresponding activity category; and
   cause a display of individual user interface arrangements that are based on the individual collaboration environments that are selected using activity categories that are determined for each agenda item, wherein the system controls transitions of the individual user interface arrangements using the individual collaboration environments as the communication session progresses through the agenda items.

16. The computer-readable storage medium of claim 15, wherein the instructions further cause the one or more processing units to analyze shared content that is provided from one or more devices of one or more participants of the communication session to determine a compatibility level between an individual collaboration environment and an individual agenda item, wherein the selection of the individual collaboration environment is based on the compatibility level.

17. The computer-readable storage medium of claim 15, wherein the instructions further cause the one or more processing units to analyze user profiles of one or more participants of the communication session to determine a compatibility level between the user profiles and an individual collaboration environment, wherein the selection of the individual collaboration environment is based, at least in part, on the compatibility level between the user profiles and the individual collaboration environment.

18. The computer-readable storage medium of claim 15, wherein the instructions further cause the one or more processing units to analyze a number of participants of the communication session to determine a compatibility level between the number of participants and an individual collaboration environment, wherein the selection of the individual collaboration environment is based on the compatibility level between the number of participants and attributes of the individual collaboration environment.

19. The computer-readable storage medium of claim 15, wherein the instructions further cause the one or more processing units to analyze a number of participants of the communication session to select virtual objects to be positioned within individual collaboration environments, wherein the display of the individual collaboration environments includes at least one of the virtual objects.

20. The computer-readable storage medium of claim 15, wherein the instructions further cause the one or more processing units to analyze content that is shared from participants of the communication session to select virtual objects to be positioned within individual collaboration environments, wherein the display of the individual collaboration environments includes at least one of the virtual objects.

* * * * *